United States Patent
Oki et al.

(10) Patent No.: US 6,676,735 B2
(45) Date of Patent: Jan. 13, 2004

(54) AQUEOUS INK

(75) Inventors: Yasuhiro Oki, Nagano-ken (JP);
Kazuhiko Kitamura, Nagano-ken (JP);
Tetsuya Aoyama, Nagano-ken (JP);
Nobuo Uotani, Chiba-ken (JP); Hiroshi Takahashi, Chiba-ken (JP); Yuji Ito, Chiba-ken (JP)

(73) Assignee: Seiko Epson Corporation, Tokyo (JP)

( * ) Notice: Subject to any disclaimer, the term of this patent is extended or adjusted under 35 U.S.C. 154(b) by 67 days.

(21) Appl. No.: 09/886,949

(22) Filed: Jun. 21, 2001

(65) Prior Publication Data

US 2002/0050226 A1 May 2, 2002

(30) Foreign Application Priority Data

| Jun. 21, 2000 | (JP) | 2000-186213 |
| Jun. 21, 2000 | (JP) | 2000-186214 |
| Dec. 15, 2000 | (JP) | 2000-381513 |
| Apr. 23, 2001 | (JP) | 2001-124281 |

(51) Int. Cl.$^7$ .............................. C09D 11/00
(52) U.S. Cl. .................. 106/31.46; 106/31.47; 106/31.49; 106/31.58; 106/31.76; 106/31.77; 106/31.78; 106/31.86
(58) Field of Search .................. 106/31.46, 31.47, 106/31.49, 31.76, 31.77, 31.78, 31.58, 31.86

(56) References Cited

U.S. PATENT DOCUMENTS

2001/0021440 A1 * 9/2001 Hanmura et al. ............ 428/195

FOREIGN PATENT DOCUMENTS

| EP | 0909798 | | 4/1999 |
| EP | 0911374 | | 4/1999 |
| EP | 1067155 | * | 1/2001 |
| EP | 1123932 | * | 8/2001 |
| JP | 11170686 | | 6/1999 |
| WO | WO99/48981 | * | 9/1999 |
| WO | WO00/23440 | * | 4/2000 |

OTHER PUBLICATIONS

English translation of JP11/170686, including claims, Jun. 1999.*
Sirbiladze, K.j. et Al. "The Role of Free Radical Transformation in the Photodegradation of Reactive Dyed Cellulosic Textiles" Dyes and Pigments 19, p. 235–247, (1992), no month available.
Patent Abstracts of Japan Publication No. 11170686 Dated Jun. 29, 1999.

* cited by examiner

Primary Examiner—Helene Klemanski
(74) Attorney, Agent, or Firm—Ladas & Parry

(57) ABSTRACT

An aqueous ink comprising at least a colorant, a water-soluble organic solvent and a compound represented by general formula (I) shown below, wherein said water-soluble organic solvent stays liquid at a temperature of not higher than 40° C., exhibits a water solubility of not lower than 1% by weight at a temperature of 20° C. and a saturated vapor pressure of not higher than 1.7 Pa at a temperature of 20° C. and is contained in an amount of from 5 to 35% by weight:

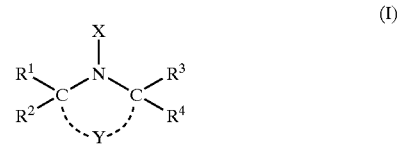

(I)

wherein Y represents a nonmetallic atom group required to form a 5- to 7-membered ring with C and N; X represents a hydrogen atom, oxyradical group, hydroxyl group, alkyl group, alkenyl group, alkynyl group, aryl group, acyl group, sulfonyl group, sulfinyl group, alkoxy group, aryloxy group or acyloxy group; and $R^1$ to $R^4$ may be the same or different and each represent a hydrogen atom or alkyl group, with the proviso that any two of $R^1$ to $R^4$ and Y may be connected to each other to form a 5- to 7-membered ring.

19 Claims, No Drawings

AQUEOUS INK

FIELD OF THE INVENTION

The present invention relates to a high reliability aqueous ink which provides prints having an excellent light-resistance and print quality, exhibits a high storage stability and an excellent reliability in objection and doesn't clog nozzle particularly when used as an ink for ink jet recording.

The present invention also relates to an aqueous ink for ink jet recording which can provide prints having an excellent light-resistance.

The present invention further relates to a high reliability aqueous ink which provides prints having an excellent light-resistance and print quality, exhibits a high liquid stability and an excellent storage stability and doesn't clog nozzle particularly when used as an ink for ink jet recording.

The present invention further relates to an ink for ink jet recording which can form an image having an excellent light-resistance and a high quality.

DESCRIPTION OF RELATED ART

In an ink jet recording method, an ink droplet is directly ejected from a very fine nozzle onto a recording medium so that it is attached thereto to obtain letters and images. Referring to principle of operation, this recording method can be carried out by various methods such as deflection method, cavity method, thermojet method, bubble jet method and thermal ink jet method. However, in any ink jet recording method, ink droplets must be continuously and stably ejected from a fine nozzle. Therefore, the ink jet recording ink is required to prevent itself from clogging the nozzle in addition to being excellent in various properties such as storage stability, reliability in ejection and print quality similarly to ordinary inks.

In recent years, an ink jet printer has widely spread. An ink jet recording method can print a high fidelity image with a high resolution at a high speed using a relatively inexpensive apparatus. In particular, a color ink jet recording apparatus can form images with an enhanced quality and can be used also as a photographic output machine. The color ink jet recording apparatus has been used even as digital printer, plotter, CAD output device, etc. Images thus printed by the ink jet recording printer which has found wide application can be used in various ways. For example, photograph grade prints are possibly put as display in places where they can be exposed to fluorescent light or sunshine outdoor over an extended period of time. Accordingly, light-resistance is one off extremely important requirements for ink composition for use in ink jet recording. It is also desired in the art of photograph grade printing that the image thus formed has so high a quality that it has little running and a good color development.

Further, as an aqueous ink there is mainly used an aqueous dye ink from the standpoint of handleability and color reproducibility. However, such an aqueous ink comprises photosensitive optical deterioration-initiating factors incorporated in the colorant or solvent constituting the ink and thus is disadvantage in that the colorant undergoes photo-oxidation and hence so-called photo-deterioration such as discoloration. Accordingly, the prints obtained by ink jet recording with such an ink exhibit a deteriorated light-resistance and thus is disadvantageous in that they are subject to disappearance of recorded letters or discoloration of recorded images in a relatively short period of time even when posted on the wall or under any other ordinary conditions.

In order to solve the foregoing problems, it has been heretofore practiced to incorporate a light-resistance improver such as ultraviolet absorber, light-stabilizer and oxidation inhibitor in a dye ink. For example, it is disclosed in "Dyes and Pigments 19", 1992, pp. 235–247, that the incorporation of 2,2,6,6-tetramethyl-4-hydroxypiperidine-1-oxyl as a hindered amino-based light-stabilizer in an aqueous solution containing a dye makes it possible to prevent photo-deterioration of the dye. JP-A-11-170686 (The term "JP-A" as used herein means an "unexamined published Japanese patent application"), which was filed after the issue of the above cited reference ("Dyes and Pigments 19"), discloses a technique which comprises incorporating a specific compound (2,2,6,6-tetramethyl-4-hydroxypiperidine-1-oxyl as mentioned above or derivative thereof) in an aqueous recording solution for ink jet recording containing a water-soluble dye to stabilize the water-soluble dye. The foregoing compound acts to capture radicals such as R. (alkyl radical) produced by optical excitation of a carbonyl compound or the like and ROO. (peroxide radical) produced by the reaction or R. with oxygen in the air to stop the progress of photo-oxidation reaction of the colorant and hence inhibit photo-deterioration thereof and thus is effective as a light-resistance improver.

Although the foregoing aqueous recording solution for ink jet recording, even if it comprises foregoing specific compound effective as a light-resistance improver, can provide prints no letter and/or images having improved properties, it is disadvantageous in that it is subject to disappearance of recorded letters or discoloration of recorded images in a long range.

The foregoing aqueous recording solution for ink jet recording also exhibits a deteriorated print quality, storage stability and reliability in ejection and a low reliability and thus can clog the nozzle particularly during ink jet recording.

The foregoing aqueous recording solution for ink jet recording also exhibits a low liquid stability and a deteriorated storage stability and thus can clog the nozzle during ink jet recording.

Since an ink jet recording printer forms droplets by applying pressure to a liquid ink, the ink ejection pressure can be absorbed by the ink, if bubbles or bubble nuclei are present therein, occasionally disabling the ink from being ejected from the nozzle.

The production of bubbles or bubble nuclei in the ink passage of the printer can be caused by the entrance of bubbles from the ink supply portion or from the nozzle portion of the printing head. In the former case, the ink is bubbled during its preparation or use to produce bubbles therein. In order to overcome this case of trouble, it is devised to deaerate the ink during preparation and then put it in a vessel having a low air permeability so that the entrance of air into the ink can be inhibited. In order to prevent the entrance of air from the connection between the ink tank and the supply inlet, the connection is sealed with a rubber packing or the like to enhance the air-tightness of the passage. In the latter case, on the other hand, the entrance of bubbles due to destruction of ink meniscus in the nozzle portion can be a main cause. The cause of destruction of ink meniscus can be impact or scanning by the printing head. In order to prevent these troubles, it can be proposed to enhance the surface tension and impact resistance of an ink. However, such an ink having an enhanced surface tension and impact resistance penetrates into the recording medium at a reduced rate, occasionally exerting fatal effects on image quality, e.g., deteriorated print quality such as blurred profile in color image. It has thus been desired to provide an aqueous ink which can be prevented from being bubbled without raising its surface tension for the purpose of giving an excellent print stability while maintaining desired print quality.

SUMMARY OF THE INVENTION

It is therefore an object of the present invention to provide a high reliability aqueous ink which provides prints having an excellent light-resistance and print quality, exhibits a high storage stability and an excellent reliability in ejection and doesn't clog nozzle particularly when used as an ink for ink jet recording.

It is another object of the present invention to provide an aqueous ink capable of providing prints which are so excellent in light-resistance that they are not subject to disappearance of recorded letters or discoloration of recorded images for a long period of time.

It is a further object of the present invention to provide a high reliability aqueous ink which provides prints having an excellent light-resistance and print quality, exhibits a high liquid stability and an excellent storage stability and doesn't clog nozzle particularly when used as an ink for ink jet recording.

It is a still further object of the present invention to provide an aqueous ink for ink jet recording which can realize a recorded image excellent in light-resistance and image quality and can hardly be bubbled.

The inventors made extensive studies of aqueous ink comprising at least a colorant, a water-soluble organic solvent and a specific compound as a light-stabilizer. As a result, it was found that the reason why the aqueous recording solution for ink jet recording described in the above cited publication (see paragraphs [0068], [0069] and [0076]) exhibits deteriorated storage stability, reliability in ejection and print quality and clogs nozzle is attributed to the fact that it is quite free of low volatility component. However, it was also found that such a low volatility component, if used excessively, produces much radicals, lessening the light-resistance which has been attained with much efforts. Further studies were made on the oasis of these findings. As a result, it was found that the incorporation of a low volatility component in an aqueous ink in a specific proportion makes it possible to assure that the aqueous ink can be prevented from clogging the nozzle during ink jet recording without lessening its excellent light-resistance (finding A).

The inventors also made extensive studies of aqueous ink comprising at least a colorant, water as a main solvent and a specific compound as a light-stabilizer. As a result, it was found that the reason why the prints of letters and/or images formed by the aqueous recording solution for ink jet recording described in the above cited publication (see paragraphs [0068], [0069] and [0076] are subject to disappearance of recorded letters or discoloration of recorded images with time is attributed to the colorant incorporated. As a result of further studies, it was also found that the use of a colored substance free of azo group as the colorant to be incorporated in the aqueous ink makes it possible to obtain an ink composition which can provide prints having an excellent light-resistance (finding B).

The inventors also make extensive studies of aqueous ink comprising at least a colorant, water as a main solvent and a specific compound as a light-stabilizer. As a result, it was found that the recording solution having an excellent light-resistance described in the above cited publication (see paragraphs [0068], [0069] and [0076]) exhibits a low liquid stability and a deteriorated storage stability and causes nozzle clogging during ink jet recording is attributed to the metals and metal ions contained as impurities in the specific compound. As a result of further studies, it was also found that when these impurities are removed from the specific compound to enhance the purity thereof, the liquid stability of the recording solution can be enhanced without lessening its excellent light-resistance, making it assured that the recording solution can be prevented from clogging the nozzle during ink jet recording (finding C).

The inventors further found that when a compound having a specific structure is incorporated in an aqueous ink and the surface tension of the aqueous ink is predetermined to be not greater than 40 mN/m, the resulting prints can be provided with improved light-resistance and image quality and the aqueous ink can be prevented from being excessively bubbled as in ordinary inks (finding D).

The present invention has been worked on the basis of the foregoing finding A. The present invention provides an aqueous ink comprising at least a colorant, a water-soluble organic solvent and a compound represented by general formula (I) shown below, wherein the water-soluble organic solvent stays liquid at a temperature of not higher than 40° C., exhibits a water solubility of not lower than 1% by weight at a temperature of 20° C. and a saturated vapor pressure of not higher than 1.7 Pa at a temperature of 20° C. and is contained in an amount of from 5 to 35% by weight:

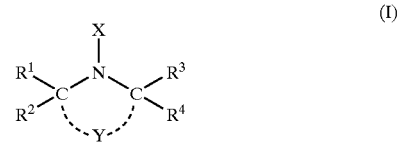

wherein Y represents a nonmetallic atom group required to form a 5- to 7membered ring with C and N; X represents a hydrogen atom, oxyradical group, hydroxyl group, alkyl group, alkenyl group, alkinyl group, aryl group, acyl group, sulfonyl group, sulfinyl group, alkoxy group, aryloxy group or acyloxy group; and $R^1$ to $R^4$ may be the same or different and each represent a hydrogen atom or alkyl group with the proviso that any two of $R^1$ to $R^4$ and Y may be connected to each other to form a 5- to 7-membered ring.

Further, the present invention has been worked out on the basis of the foregoing finding B. The present invention provides an aqueous ink comprising at least a colorant, water as a main solvent and a compound represented by the foregoing general formula (I), wherein the colorant is a colored substance free of azo group (hereinafter referred to as "second invention").

Further, the present invention has been worked out on the basis of the foregoing finding C. The present invention provides an aqueous ink comprising at least a colorant, water as a main solvent and a compound represented by the general formula (I), wherein the total content of metals and metal ions contained in the compound represented by the general formula (I) is not greater than 1,000 ppm (hereinafter referred to as "third invention").

Further, the present invention has been worked out on the basis of the foregoing finding D. The present invention provides an aqueous ink for ink jet recording comprising a compound represented by the general formula (I) and a colorant, wherein the surface tension thereof is not greater than 40 mN/m (hereinafter referred to as "fourth invention").

In accordance with the aqueous ink of the first invention, prints having an excellent light-resistance and print quality can be provided. Further, the aqueous ink of the first invention is an ink having a high storage stability, an excellent reliability in ejection and a high reliability which causes no nozzle clogging when used as an ink for ink jet recording. Thus, the aqueous ink of the first invention is fairly used in ink jet recording method.

In accordance with the aqueous ink of the second invention, prints having an excellent light-resistance can be provided. Further, the aqueous ink of the second invention is fairly used in ink jet recording in particular.

In accordance with the aqueous ink of the third invention, prints having an excellent light-resistance can be provided. Further, the aqueous ink of the third invention is an ink having a high liquid stability and an excellent storage stability and having a high reliability which causes no nozzle clogging when used as an ink for ink jet recording. Thus, the aqueous ink of the first invention is fairly used in ink jet recording method.

In accordance with the aqueous ink of the fourth invention, the incorporation of the compound represented by the foregoing general formula (I) makes it possible to remarkably improve the light-resistance of a recorded matter formed by the aqueous ink. Further, since the aqueous ink of the fourth invention is predetermined to have a surface tension of not greater than 40 mN/m, it exhibits extremely good wetting properties and thus can easily penetrate into a recording medium. Thus, when subjected to printing, the aqueous ink of the fourth invention can provide a high quality recorded image with little running. This also makes it possible to effect photograph grade printing. Further, the compound represented by the foregoing general formula (I) has an effect of inhibiting bubbling of the ink. For the purpose of adjusting the surface tension of the aqueous ink, the compound represented by the foregoing general formula (I) can inhibit excessive bubbling of the ink, which is a problem frequently caused by a commonly used penetrating agent such as surface active agent. Some colorants can undergo radical reaction to produce a gas such as nitrogen gas. The compound represented by the foregoing general formula (I) acts also as a radical polymerization inhibitor and thus can presumably inhibit the generation of bubbles in the ink also. In other words, the aqueous ink of the fourth invention can be also provided with an improved printing stability. Accordingly, the fourth invention makes it possible to further make clear the profile of color image.

DETAILED DESCRIPTION OF THE INVENTION

The aqueous ink according to the first invention will be further described hereinafter.

The aqueous ink according to the first invention comprises a colorant, a water-soluble organic solvent, and a compound represented by the foregoing general formula (1) incorporated therein as essential components.

The foregoing water-soluble organic solvent stays liquid at a temperature of not higher than 40° C. and exhibits a water solubility of not lower than 1% by weight, preferably not lower than 5% by weight at a temperature of 20° C. and a saturated vapor pressure of not higher than 1.7 Pa, preferably not higher than 1 Pa in the form of single body at a temperature or 20° C. The foregoing water-soluble organic solvent is incorporated in the aqueous ink of the first invention in an amount of from 5 to 35% by weight, preferably from 10 to 30% by weight.

In particular, it is preferred that the foregoing water-soluble organic solvent be incorporated in the aqueous ink of the first invention in an amount such that the weight ratio of the compound represented by the foregoing general formula (I) to the water-soluble organic solvent is from 1:1 to 1:100, more preferably from 1:3 to 1:80.

The measurement of saturated vapor pressure can be normally accomplished by many methods. For a low volatility solvent such as the foregoing water-soluble organic solvent according to the first invention, transpiration method (gas flowing method) may be employed to measure more accurately.

The aqueous ink of the first invention comprising the foregoing water-soluble organic solvent having the foregoing characteristics incorporated therein in the foregoing predetermined amount is an ink which exhibits an excellent storage stability, an excellent reliability in ejection and an excellent printing quality without lessening the excellent light-resistance provided by the compound represented by the foregoing general formula (I). In particular, when used as an ink for ink jet recording, the aqueous ink of the first invention can be prevented from being dried, making it possible to prevent the clogging of nozzle securely. When the content of the foregoing water-soluble organic solvent falls below 5% by weight, the resulting aqueous ink exhibits deteriorated storage stability and ejection stability, making it impossible to prevent the clogging of nozzle. On the contrary, when the content of the foregoing water-soluble organic solvent exceeds 35% by weight, the resulting aqueous ink has a source of radicals causing the photo-oxidation reaction of the colorant present therein in a large amount, making it impossible to sufficiently enhance the light-resistance thereof even if a compound represented by the foregoing general formula (I) is incorporated therein.

Examples of the foregoing water-soluble organic solvent employable herein include glycerin, 1,5 pentanediol, and triethylene glycol. These water-soluble organic solvents may be used singly or in combination of two or more thereof. Particularly preferred among these water-soluble organic solvents is glycerin.

The compound represented by the foregoing general formula (I) to be incorporated in the aqueous ink of the first invention stops the progress of photo-oxidation reaction of colorant to inhibit photo-deterioration thereof and thus is a so-called light stabilizer.

In the foregoing general formula (I), Y forms a 5- to 7-membered ring with C and N to which it is bonded. Examples of the 5- to 7-member ring formed by C, N and Y include pyrrolidine ring, piperazine ring, morpholine ring, and piperidine ring.

In the foregoing general formula (I), X represents a hydrogen atom, oxyradical group, alkyl group, alkenyl group, alkinyl group, aryl group, acyl group, sulfonyl group, sulfinyl group, alkoxy group, aryloxy group, acyloxy group or hydroxyl group.

In the foregoing general formula (I), the foregoing alkyl group represented by X is preferably a $C_1$–$C_{20}$ alkyl group, more preferably a $C_1$–$C_{18}$ alkyl group. Examples of the alkyl group represented by X include methyl group, ethyl group, n-propyl group, iso-propyl group, n-butyl group, t-butyl group, n octyl group, benzyl group, and hexadecyl group The foregoing alkenyl group represented by X is preferably a $C_1$–$C_{20}$ alkenyl group, more preferably a $C_1$–$C_{18}$ alkenyl group. Examples of the alkenyl group represented by X include allyl group, and oleyl group. The foregoing alkinyl group represented by X is preferably a $C_1$–$C_6$ lower alkinyl group such as ethenyl group. Examples of the foregoing aryl group represented by X include phenyl group, and naphthyl group. Examples of the acyl group represented by X include acetyl group, benzoyl group, and pentanoyl group. Examples of the foregoing sulfonyl group represented by X include methanesulfonyl group, benzenesulfonyl group, and toluenesulfonyl group. Examples of the foregoing sulfinyl group represented by X include methanesulfinyl group, and benzenesulfinyl group. The foregoing alkoxy group represented by X is preferably a $C_1$–$C_0$ alkoxy group. Examples of the alkoxy group include methoxy group, ethoxy group, 1-propoxy group, n-butoxy groups cyclohexyloxy group, n-octyloxy group, t-octyloxy group, and benzyloxy group. Examples of the foregoing aryloxy group represented by X include phenoxy group. Examples of the foregoing acyloxy group represented by X include acetyloxy group, and benzoyloxy group. These groups may have substituents. Examples of these substituents include sulfonyl group, carboxyl group, and hydroxyl group. In particular, X is preferably an oxyradical group.

In a preferred embodiment of implication of the first invention, the compound represented by the foregoing general formula (I) is preferably a compound represented by the following general formula (II) having a water-soluble group:

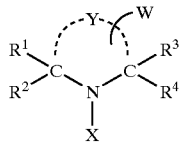

(II)

wherein w represents a water-soluble group; and X, Y, $R^1$, $R^2$, $R^3$ and $R^4$ are as defined in the foregoing general formula (I).

The foregoing water-soluble group is more preferably anionic water soluble group. An anionic water-soluble group is a group having a dissociative group having pKa of from not smaller than 1 to not greater than 12. The term "pKa" as used herein means the acid dissociation coefficient determined when a compound represented by the foregoing general formula (I) is dissolved in a 6/4 mixture of tetrahydrofuran (THF) and water at room temperature. The pKa value of the anionic water-soluble group is more preferably from not smaller than 3 to not greater than 12, even more preferably from not smaller than 5 to not greater than 11. Preferred examples of the foregoing anionic water-soluble group include those containing —OH group, —$SO_3H$ group, —$SO_2NH$—(R) group, phenolic hydroxyl group,— CON(R)—OH group, and —COOH group (in which R represents H or alkyl group (preferably $C_1$–$C_8$ alkyl group, e.g., methyl, ethyl)). Particularly preferred among these anionic water-soluble groups are —OH group, —$SO_2NH$— (R) group, and phenolic hydroxyl group.

In the foregoing general formula (I), $R^1$ to $R^4$ may be the same or different and each represent a hydrogen atom or alkyl group. The foregoing alkyl group is selected from the group consisting of the foregoing alkyl groups represented by X. In particular, $R^2$ to $R^4$ each are preferably a methyl group. Further, any two of $R^1$ to $R^4$ and Y may be connected to each other to form a 5- to 7-membered ring.

The compound represented by the foregoing general formula (1) is preferably a compound of the general formula (I) wherein the heterocycle formed by C, N and Y is a 6-membered ring compound. Specific examples of the 6-membered ring compound include compounds (1) to (4) described in the above cited JP-A-11-170686, pp. 4–6 (paragraph [0017]–[0019]).

The preparation of the compound represented by the foregoing general formula (I) can be accomplished by any method described in "Yuki Kagaku Gosei Kyokaishi (Journal of Society of Organic Chemical Synthesis)", 29 (4), 366 ('71), JP-A-49-53571, JP-A-49-53572, JP-A-49-53573, JP-A-49-53574, JP-B-49-20974, European Patent Disclosure No. 264,730, U.S. Pat. No. 4,639,415, etc. For example, the foregoing compound (1) described in the above cited JP-A-11-170686 (hereinafter referred to as "compound (1)"), which is one of compounds represented by the foregoing general formula (I), can be prepared by the following preparation method.

Method for the Preparation of Compound (1)

The compound (1) can be prepared through the following three steps.

The first stop involves the synthesis of 2,2,6,6-tetramethyl-4-piperidone from acetone and ammonia. This step is effected according to the method described in Keisuke Murayama, "Nihon KagakuKai Zasshi (Journal of The Chemical Society of Japan)", vol. 90, No. 3, 298 (1969).

The second step comprises reducing 2,2,6,6-tetremethyl-4-piperidone obtained at the first stop to obtain 4-hydroxy-2,2,6,6-tetramethylpiperidine. The second step is effected according to the method described in EG. Rozantsev. Izv. Akad. Nauk SSSR, Ser. Khlm. 770 (1966).

The third step comprises oxidizing 4-hydroxy-2,2,6,6-tetramethylpiperidine obtained at the second step to obtain the compound (I). The third step is effected according to the method described in Keisuke Murayama, "Nihon Kagakukai Zasshi (Journal of The Chemical Society of Japan)", vol. 90, No. 3, 298 (1969), JP-A-6-100538, JP-A-6-247932, etc.

The content of the compound represented by the foregoing general formula (I) in the aqueous ink of the first invention is preferably from 0.05 to 10% by weight, more preferably from 0.1 to 5% by weight. When the content of the compound represented by the foregoing general formula (I) falls below 0.05% by weight, the photo-deterioration of the colorant cannot be sufficiently inhibited. Thus, prints obtained with the resulting ink exhibit deteriorated light-resistance and thus are subject to disappearance of recorded letters or discoloration of recorded image with time. On the contrary, when the content of the compound represented by tho foregoing general formula (I) exceeds 10% by weight, the resulting ink exhibits so low a reliability that it shows a lowered print quality (color developability) and undergoes precipitation of compound represented by the foregoing general formula (I). In particular, when used as an ink for ink jet recording, such an aqueous ink can clog the nozzle with precipitate.

As the colorant to be incorporated in the aqueous ink of the first invention there may be used almost any of colorants (dye and pigment) listed in color index. Many of those which are not listed in color index can be used preferably. In particular, dyes or organic pigments are preferably used because they exhibit a high color density per unit weight and a sharp color. As such a dye there is preferably used a water-soluble dye. Specific examples of such a water-soluble dye include those classified as acidic dye, direct dye, mordant dye, reactive dye, soluble vat dye, sulfide dye and food dye.

Examples of the foregoing colorants include C. I. Direct Black 17, 19, 32, 38, 51, 71, 74, 75, 112, 117, 154, 163, 168, C. I. Acid Black 7, 24, 26, 48, 52, 58, 60, 107, 109, 118, 119, 131, 140, 155, 156, 187, C. I. Food Black 1, 2, C. I. Direct Red 79, 80, 83, 99, 220, 224, 227, C. I. Acid Red 1, 8, 17, 32, 35, 37, 42, 52, 57, 92, 115, 119, 131, 133, 134, 154, 186, 249, 254, 256, C. I. Direct Violet 47, 51, 90, 94, C. I. Acid Violet 11, 34, 75, C. I. Direct Blue 6, 8, 15, 25, 71, 76, 80, 86, 90, 106, 108, 123, 163, 165, 199, 226, C. I. Acid Blue 9, 29, 62, 102, 104, 113, 117, 120, 175, 183, C. I. Direct Yellow 28, 33, 39, 58, 86, 100, 132, 142, and C. I. Acid Yellow 19, 23, 25, 29, 38, 49, 59, 62, 72.

The content of the foregoing colorant in the aqueous ink of the first invention is preferably from 0.1 to 20% by weight, more preferably from 0.5 to 10% by weight. When the content of the foregoing colorant falls below 0.1% by weight, the resulting print density is insufficient. On the contrary, when the content of the foregoing colorant exceeds 20% by weight, the resulting aqueous ink can be subject to disadvantages such as increase of ink viscosity and increase of possibility of clogging.

The aqueous ink of the first invention may comprise one or more of various components mentioned below incorporated therein as necessary besides the foregoing various components [colorant, water-soluble organic solvent, compound represented by the foregoing general formula (I)].

The aqueous ink of the first invention may comprise a light-resistance improver incorporated therein in combination with the compound represented by the foregoing general formula (I) to further improve the light-resistance thereof. As the light-resistance improver there may be used any water-soluble compound which can prevent photo-deterioration of colorant by ultraviolet rays or visible light. Preferably, one or more compounds selected from the group consisting of ultraviolet absorber, extinguisher and oxidation inhibitor may be used.

Examples of tho foregoing ultraviolet absorber include benzophenone-based compound, salicylate-based compound, benzophenone-based compound, cyano acrylate-based compound, and metal oxide such as titanium oxide, zinc oxide, selenium oxide and cerium oxide. Examples of the foregoing extinguisher include nickel salts such as nickel dibutyl dithiocarbamate, nickel sulfate and nickel oxalate, halogenated metals such as potassium iodide, sodium iodide, potassium bromide, sodium bromide and potassium chloride, potassium thiocyanate, cobalt sulfate, copper sulfate, and ferrous sulfate. Examples of the foregoing oxidation inhibitor include hindered phenol compound, amine compound, phosphorus compound, and sulfur compound.

The content or the foregoing light-resistance improver in the aqueous ink of the first invention is preferably from 0.01 to 5% by weight, more preferably from 0.05 to 2% by weight from the standpoint or light-resistance of recorded material obtained by attaching the aqueous ink to a recording medium and the solubility of the light-resistance improver in the aqueous ink.

The aqueous ink of the first invention preferably further comprises a penetration accelerator incorporated therein. Preferred examples of the penetration accelerator include alkyl others of polyvalent alcohol such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1 methyl 1 methoxybutanol, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol monomethyl ether, dipropylene glycol monoethyl ether, dipropylene glycol mono-n-propyl ether and dipropylene glycol mono-iso-propyl ether. These penetration accelerators may be used singly or in combination of two or more thereof.

The content of the foregoing penetration accelerator in the aqueous ink of the first invention is preferably from 3 to 20% by weight, more preferably from 5 to 15% by weight.

The aqueous ink of the first invention preferably comprises water incorporated therein as a main solvent from the standpoint of print quality, solubility of constituent components, safety, etc. As water there may be used purified water such as ion-exchanged water, ultrafiltered water, reverse osmosis water and distilled water or ultrahighly-purified water. In particular, water sterilized by irradiation with ultraviolet rays or addition of hydrogen peroxide is preferably used to prevent the proliferation of mildew or bacteria and hence enable prolonged storage of the ink.

The content of water in the aqueous ink of the first invention is preferably from 40 to 90% by weight, more preferably from 55 to 80% by weight.

The aqueous ink of the first invention may further comprise additives such as viscosity modifier, preservative, mildewproofing agent, pH adjustor, dissolution aid, oxidation inhibitor, surface tension modifier, nozzle clogging inhibitor and dielectric constant modifier incorporated therein, singly or in combination of two or more thereof, as necessary.

For the purpose of sufficiently attaining the effect of those additives, any solvent other than the foregoing water-soluble organic solvents may be added to the aqueous ink of the first invention.

The aqueous ink of the first invention preferably exhibits a viscosity of less than 5 mPa.s at a temperature of 20° C. Examples of the method for adjusting the viscosity of the aqueous ink to the above defined range include a method which comprises adjusting the content of the foregoing various components to be incorporated in the aqueous ink, and a method which comprises adding a viscosity modifier to the ink. Preferred examples of the viscosity modifier to be used in the adjustment of the viscosity of the aqueous ink by the latter method include polyvalent alcohols such as ethylene glycol, diethylene glycol, polyethylene glycol, polypropylene glycol, propylene glycol, butylene glycol, thioglycol and hexylene glycol, urea, and water-soluble organic solvents such as 2-pyrrolidone, N-methyl-2-pyrrolidone, 1,3-dimethyl-2-imidazolidinone, formamide, acetamide, dimethyl sulfoxide, sorbitol, sorbitan, diacetin, triacetin and sulfolane. These viscosity modifiers may be used singly or in combination of two or more thereof. The content of the foregoing viscosity modifier in the aqueous ink of the first invention is preferably not greater than 20% by weight. The foregoing viscosity modifier causes little problem when used in a small amount. When the content or the foregoing viscosity modifier exceeds 20% by weight, it is likely that the effect of inhibiting the photo-deterioration or ink by the compound represented by the foregoing general formula (I) can be lessened, making it impossible to provide prints with an excellent light-resistance.

Examples of the foregoing preservative/mildewproofing agent to be incorporated in the aqueous ink of the first invention include sodium benzoate, pentachlorophenol sodium, 2-pyridinethiol-1-oxide, sodium, sodium sorbinate, sodium dehydroacetate, and 1,2-dibendisothiazoline-3-one (Proxel CRL, Proxel BDN, Proxel GXL, Proxel XL-2, Proxel TN, produced by AVECIA INC.) These chemicals may be used singly or in combination of two or more thereof.

Examples of the foregoing pH adjustor, dissolution aid and oxidation inhibitor to be incorporated in the aqueous ink of the first invention include amines such as diethanolamine, triethanolamine, propanolamine and morpholine, modification products thereof, inorganic salts such as potassium hydroxide, sodium hydroxide and lithium hydroxide, ammonium hydroxide, quaternary ammonium hydroxide (e.g., tetramethyl ammonium), carbonates such as potassium carbonate, sodium carbonate and lithium carbonate, phosphates, ureas such as 2-pyrrolidone, N-methyl-2-pyrrolidone, urea, thiourea and tetramethylurea, alohanates such as alohanate and methyl alohanate, biurets such as biuret, dimethyl biuret and tetramethyl biuret, L-ascorbic acid, and salts thereof. These compounds may be used singly or in combination of two or more thereof.

The aqueous ink of the first invention may be fairly used for any recording method which comprises attaching it to a recording medium for printing. Examples of such a recording method include an ink jet recording method which comprises ejecting a droplet of aqueous ink so that it is attached to a recording medium to effect printing, a recording method using a writing utensil such as pen, and various other printing methods. Particularly preferred among these recording methods to which the aqueous ink of the first invention can be applied is ink jet recording method, even more preferably on-demand type ink jet recording method. Examples of the on-demand type ink jet recording method include a piezoelectric element recording method involving the use of a piezoelectric element provided in a printer head, and a heat jet recording method involving the use of heat energy developed by a heater such as heat-generating resistor element provided in a printer head. The aqueous ink of the first invention can provide excellent results in any of these recording methods.

The aqueous ink according to the second invention will be further described hereinafter. The aqueous ink of the second invention comprises a colorant, water as a main solvent, and a compound represented by the foregoing general formula (I) incorporated therein as essential components and thus is characterized by the combination of a colorant and a compound represented by the foregoing general formula (I).

The colorant to be incorporated in the aqueous ink of the second invention is a colored substance free of azo group (—N═N—).

Examples of the foregoing colored substance (colorant) free of azo group include anthraquinones, indigoids, phthalocyanines, carboniums, quinonimines, methines, quinolines, nitros, nitrosos, benzoquinones, naphthoquinones, naphthalimides, and perinones. Particularly preferred among these colored substances are anthraquinones.

The foregoing colored substance (colorant) free of azo group can be selected from the group consisting of dyes and pigments. In particular, the colored substance (colorant) free of azo group is preferably selected from dyes or organic pigments because they exhibit a high color density per unit weight and a sharp color. Examples of the dye employable herein include those described with reference to the first invention.

Examples of the foregoing colored substance (colorant) free of azo group include C. I. Acid Yellow 1, 3, 7, C. I. Basic Yellow 28, C. I. Pigment Yellow 23, C. I. Acid Red 49, 51, 52, 80, 82, 83, 87, 92, 94, 289, C. I. Mordant Red 3, 11, 15, 27, C. I. Sulfur Red 7, C. I. Food Red 14, C. I. Pigment Red 81, 83, 89, 90, C. I. Acid Blue 1, 7, 9, 15, 22, 23, 25, 27, 40, 41, 43, 45, 54, 59, 62, 74, 78, 80, 82, 83, 90, 93, 100, 102, 103, 104, 112, 126, 127, 129, 130, 143, 182, 183, 203, 204, 205, C. I. Direct Blue 41, 86, 106, 108, 199, C. T. Mordant Blue 1, 8, 29, 47, C. I. Sulfur Blue 9, 13, C. I. Vat Blue 42, 43, C. I. Reactive Blue 1, 2, 3, 4, 5, 7, 14, 15, 17, 18, 19, 21, 25, 27, 29, 32, 37, 38, 41, 44, 46, C. I. Vat Blue 29, C. I. Solubilized Vat Blue 1, 5, 41, C. I. Food Blue 1, 2, C. I. Basic Blue 9, 25, 44, C. I. Pigment Blue 1, 17, C. I. Acid Black 2, 48, 50, C. I. Mordant Black 13, and C. I. Reactive Black 12. These colored substances may be used singly or in combination of two or more thereof.

Other examples of the foregoing colored substance (colorant) free of azo group include a colored substance represented by the following general formula (A) described in JP-A-2000-109464 and JP-A-2000-191600.

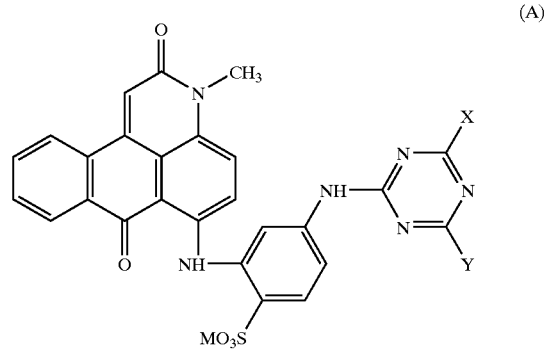

(A)

wherein X represents an anilino group substitute by at least one SO₃M; Y represents OH, Cl or morpholino group; and M represents H, Li, Na, K, ammonium or organic amine.

Examples of the colored substance represented by the foregoing general formula (A) include compounds (A1) to (A12) shown below. These compounds may be used singly or in combination of two or more thereof. Particularly preferred among these compounds is compound (A4).

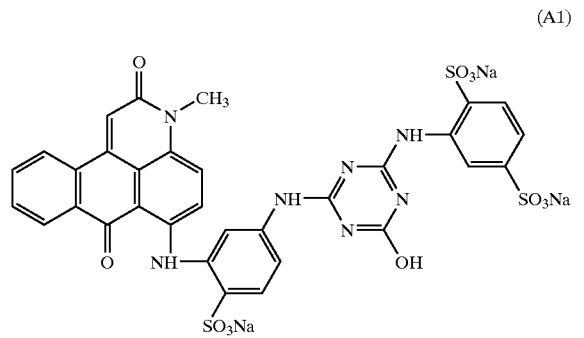

(A1)

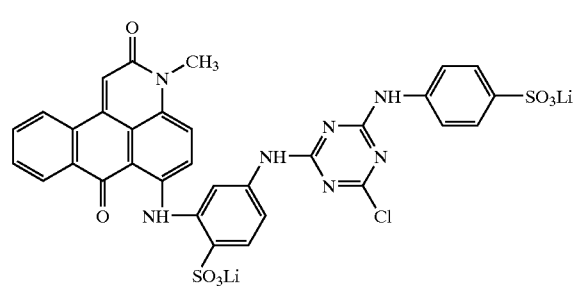

(A2)

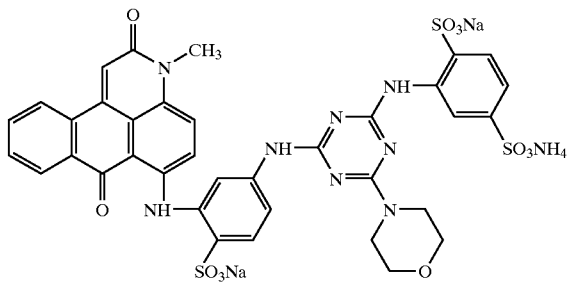
(A3)
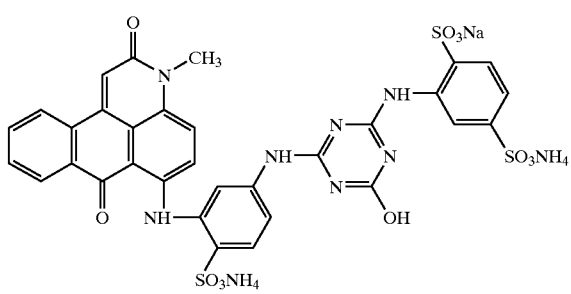
(A4)
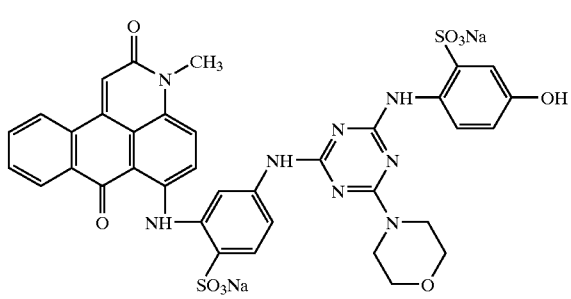
(A5)
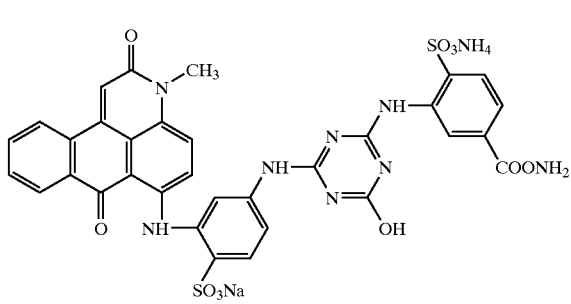
(A6)
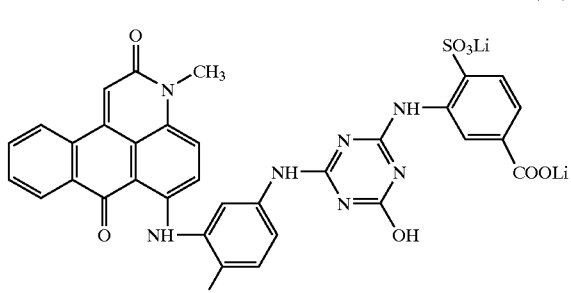
(A7)
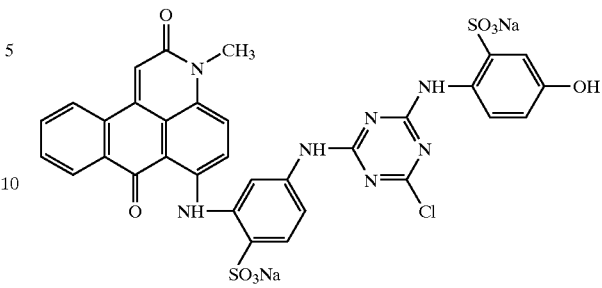
(A8)
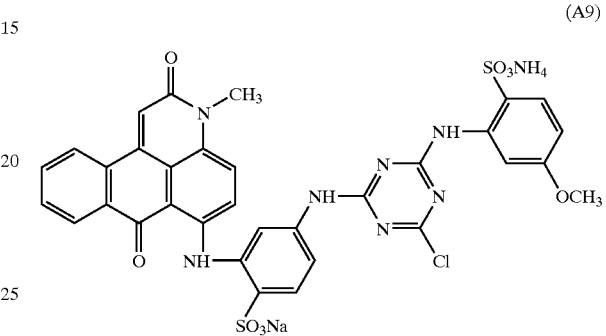
(A9)
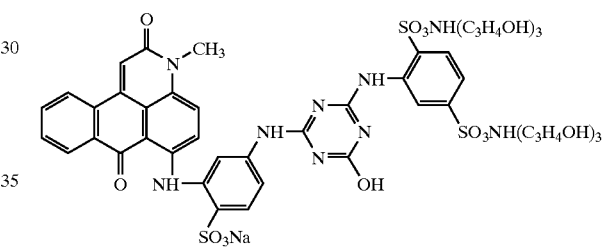
(A10)
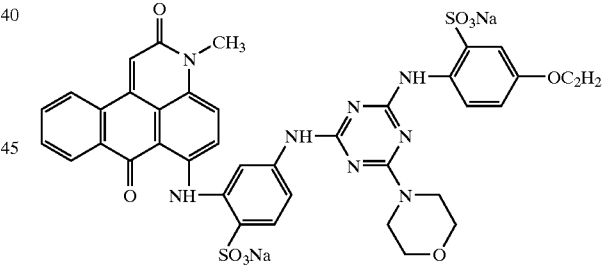
(A11)
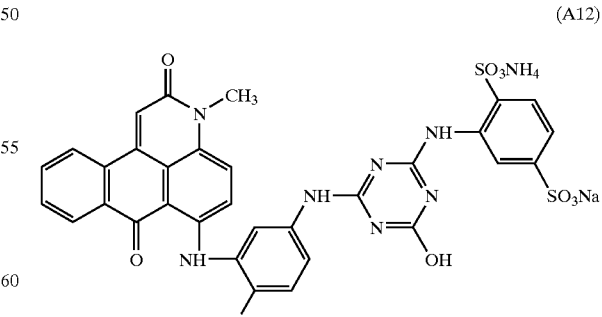
(A12)
The content of the foregoing colored substance (colorant) free of azo group in the aqueous ink of the second invention is preferably from 0.1 to 20% by weight, more preferably from 0.5 to 10 by weight. When the content of the foregoing colorant falls below 0.1% by weight, the resulting print density is insufficient. On the contrary, when the content of the foregoing colorant exceeds 20% by weight, the resulting aqueous ink can be subject to disadvantages such as increase of ink viscosity and increase of possibility of clogging.

The compound represented by the foregoing general formula (I) to be incorporated in the aqueous ink of the second invention stops the progress of photo-oxidation reaction of colorant to inhibit photo-deterioration thereof and thus is a so-called light stabilizer. Examples of the compound represented by the foregoing general formula (1) employable herein include those described with reference to the aqueous ink of the first invention. The content of the compound represented by the foregoing general formula (I) is the same as in the first invention. In a preferred embodiment, the compound of general formula (I) is a compound represented by the foregoing general formula (II) as set forth in the first invention.

In the aqueous ink of the second invention, the weight ratio of content of the foregoing colored substance (colorant) free of azo group to the compound represented by the foregoing general formula (I) is preferably from 4:1 to 1:10, particularly from 3:1 to 1:5 from the standpoint of balance of light-resistance of printed matter and reliability of ink.

The aqueous ink of the second invention comprises water incorporated therein as a main solvent. An water there may be used the same water as used in the aqueous ink of the first invention. The content of water in the aqueous ink of the second invention is the same as in the The aqueous ink of the second invention may comprise various components described below incorporated therein, singly or in combination of two or more thereof, as necessary in addition to the foregoing various components (colorant, water as a main solvent, compound represented by the foregoing general formula (I)).

The aqueous ink of the second invention may comprise a light-resistance improver having other functions incorporated therein in combination with the compound represented by the foregoing general formula (I) for the purpose of further improving the light-resistance thereof. As the light-resistance improver there may be used the same as in the aqueous ink of the first invention. The content of the light-resistance improver in the aqueous ink of the second invention is the same as in the first invention.

The aqueous ink of the second invention preferably further comprises a penetration accelerator incorporated therein. As such a penetration accelerator there is preferably used a lower alkyl ether of polyvalent alcohol. In some detail, the same compound as used in the aqueous ink of the first invention may be used. The content of the penetration accelerator in the aqueous ink of the second invention is the same as in the first invention.

The aqueous ink of the second invention preferably further comprises a surface active agent incorporated therein for the purpose of accelerating the penetration of the ink, improving the reliability in ejection and providing a high quality image. Examples of the surface active agent employable herein include anionic surface active agents (e.g., sodium dodecylbenzenesulfonate, sodium laurate, ammonium polyoxyethylenealkylethersulfate), nonionic surface active agents (e.g., polyoxyethylene alkyl ether, polyoxyethylene alkyl ester polyoxyethylone sorbitan aliphatic acid ester, polyoxyethylene alkylphenyl ether, polyoxyethylene alkylamine, polyoxyethylene alkylamide), and acetylene glycol-based surface active agents. In the second invention, these surface active agents may be used singly or in combination of two or more thereof.

As the foregoing acetylene glycol-based surface active agent there is preferably used a compound represented by the following general formula (a).

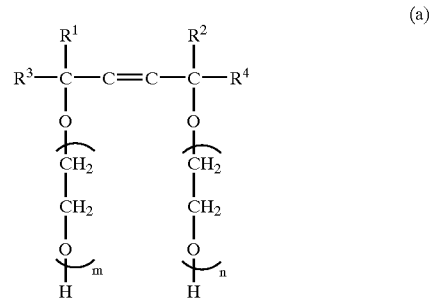

(a)

wherein m and n satisfy the relationship $0 \leqq m+n \leqq 50$; and $R^1$ to $R^4$ each independently represent an alkyl group, preferably a $C_1$–$C6$ alkyl group.

Specific preferred examples of the compound represented by the foregoing general formula (a) (acetylene glycol-based surface active agent) include 2,4,7,9-5-decine-4,7-diol, 3,6-dimethyl-4-octine-3,6-diol, and 3,5-dimethyl-1-hexine-3-ol. As these acetylene glycol-based surface active agents there may be used commercially available products. Examples of these commercially available products include Surfinol 82, 104, 440, 466, 485, TG (produced by Air Products and Chemicals, Inc.), and Orfin STG, Orfin E1010 (produced by Nissin Chemical Industry Co., Ltd.).

The content of the foregoing surface active agent in the aqueous ink of the second invention is preferably from 0.1 to 5% by weight, more preferably from 0.2 to 3% by weight.

The aqueous ink of the second invention preferably further comprises a wetting agent made of a high boiling organic solvent incorporated therein. Examples of the wetting agent made of a high boiling organic solvent employable herein include polyvalent alcohols such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane and trimethylolpropane, urea, 2-pyrrolidone, N-methyl-2-pyrrolidone, 1,3-dimethyl-2 imidazolidinone, formamide acetamide, dimethylsulfoxide, sorbitol, sorbitan, acetin, diacetin, triacetin, and sulfolane. These wetting agents may be used singly or in combination of two or more thereof. Particularly preferred among these wetting agents are glycerin, diethylene glycol, and triethylene glycol.

The content of the foregoing wetting agent made of a high boiling organic solvent in the aqueous ink of the second invention is preferably from 5 to 30% by weight, more preferably from 8 to 25% by weight.

The aqueous ink of the second invention may further comprise various additives incorporated therein, singly or in combination of two or more thereof, as necessary. Examples of the additives employable herein include the same additives as used in the aqueous ink of the first invention.

As the preservative/mildewproofing agent to be incorporated in the aqueous ink of the second invention there may be used the same material as used in the aqueous ink of the first invention.

As the pH adjuster, dissolution aid and oxidation inhibitor to be incorporated in the aqueous ink of the second invention there may be used the same materials as used in the aqueous ink of the first invention.

Examples of the surface tension adjustor to be incorporated in the aqueous ink of the second invention include alcohols such as diethanolamine, triethanolamine and diethylene glycol, and nonionic, cationic, anionic and amphoteric surface active agents. These surface tension adjustors may be used singly or in combination of two or more thereof.

The aqueous ink of the second invention preferably exhibits a viscosity of not greater than 10 mPa.s, more preferably not greater than 5 mPa.s, at a temperature of 20° C. Examples of the method for adjusting the viscosity of the aqueous ink to the above defined range include a method which comprises adjusting the content of the foregoing is components to be incorporated in the aqueous ink, and a method which comprises adjusting the kind and content of the foregoing wetting agent made of a high boiling organic solvent. In particular, the latter method is preferred.

The aqueous ink of the second invention preferably exhibits a surface tension of from 15 to 50 mN/m, more preferably from 25 to 40 mN/m at a temperature of 20° C. The adjustment of the surface tension of the aqueous ink can be accomplished by incorporating the foregoing surface active agent therein in the foregoing predetermined amount.

The aqueous ink of the second invention may be fairly used for any recording method which comprises attaching it to a recording medium to effect printing similarly to the aqueous ink of the first invention. Examples of the recording method to which the aqueous ink of the second invention can be applied include those described previously.

The aqueous ink according to the third invention will be further described hereinafter.

The aqueous ink of the third invention comprises a colorant, water as a main solvent, and a compound represented by the foregoing general formula (I) incorporated therein as essential components. These essential components are each known themselves. The compound represented by the foregoing general formula (I) to be incorporated in the aqueous ink of the first invention stops the progress of photo-oxidation reaction of colorant to inhibit photo-deterioration thereof and thus is a so-called light stabilizer. Examples of the compound represented by the foregoing general formula (I) employable herein include those described with reference to the aqueous ink of the first invention. The content of the compound represented by the foregoing general formula (I) is the same as in the first invention. In a preferred embodiment, the compound of general formula (I) is a compound represented by the foregoing general formula (II) as set forth in the first invention.

The structure of the compound represented by the foregoing general formula (I), which is one of the essential components of the aqueous ink of the third invention, is as described previously. The main feature of the third invention is that the total content of metals and metal ions to be contained in the compound represented by the foregoing general formula (I) is not greater than 1,000 ppm, preferably not greater than 500 ppm.

In particular, the total content of polyvalent metal ions having a valence of 2 or more in the metal ions is preferably not greater than 800 ppm, more preferably 400 ppm.

Further, the total content of the foregoing metals is preferably not greater than 200 ppm, more preferably not greater than 100 ppm.

The aqueous ink of the third invention comprising a compound represented by the foregoing general formula (I) containing metals and metal ions in a total amount of not greater than the foregoing value can maintain an excellent light-resistance provided by the compound of the general formula (I) and exhibits a high liquid stability and an excellent storage stability. The aqueous ink of the third invention cannot cause clogging of the nozzle when used as an ink for ink jet recording. When the total content of metals and metal ions contained in the compound represented by the foregoing general formulas (I) exceeds the foregoing value, the resulting aqueous ink exhibits a deteriorated liquid stability and thus can cause precipitation during the storage of the ink. In particular, when used as an ink for ink jet recording, the aqueous ink can cause clogging of nozzle.

Specific examples of the foregoing metal to be incorporated in the compound represented by the foregoing general formula (I) include Na, K, Mg, Ca, Al, Fe, Co, Ni, Cu, Zn, Cr, Mn, and Si. Specific examples of the foregoing metal ion include $Na^+$, $K^+$, $Mg^{2+}$, $Ca^{2+}$, $Al^{3+}$, $Fe^{2+}$, $Fe^{3+}$, $Co^{2+}$, $Co^{3+}$, $Ni^{2+}$, $Cu^{2+}$, $Cu^{2+}$, $Zn^{2+}$, $Cr^{3+}$, $Mn^{2+}$, $Mn^{4+}$, $Mn^{7+}$ and $Si^{4+}$.

Similarly, the total content of anions contained in the compound represented by the foregoing general formula (I) is preferably not greater than 1,000 ppm, particularly not greater than 500 ppm for the purpose of improving the liquid stability of the ink and preventing the clogging of nozzle.

Specific examples of these anions include $F^-$, $Cl^-$, $Br^-$, $NO_2^-$, $NO_3^-$, $SO_4^{2-}$, and $PO_4^{3-}$.

As a method for adjusting the content of impurities (metal, metal ion, anion) to be contained in the compound represented by the foregoing general formula (I) to not greater than the above defined predetermined value to enhance the purity of the compound of the general formula (I) there may be used a method involving the purification of the compound of the general formula (I) by ion exchanging, osmosis membrane method, reverse osmosis method, electrodialysis method or the like. In some detail, the compound of the general formula (I) is purified by the following purification method.

Method for the Purification of Compound Represented by the Foregoing General Formula (I)

A glass column (diameter: 3 cm) was filled with 25 g of Amberlite TR120 B (produced by Rohm and Haas Company). 100 g of a 5% aqueous solution of hydrochloric acid was then passed through the column in 10 minutes. Thereafter, 300 g of ion-exchanged water was passed through the column in 30 minutes. When it was confirmed that the ion-exchanged water passed through the column was neutral, the glass column was defined to be a cation exchange column.

A separate glass column (diameter: 3 cm) was filled with 25 g of Amberlite IRA400 (produced by Rohm and Haas Company). 100 g of a 5% aqueous 5% solution of sodium hydroxide was then passed through the column in 10 minutes Thereafter, 300 g of ion-exchanged water was passed through the column in 30 minutes. When it was confirmed that the ion-exchanged water passed through the column was neutral, the glass column was defined to be an anion exchange column.

10 g of commercially available industrial H TEMPO (corresponding to the compound of the general formula (I) described in the above cited JP-A-11-170686; hereinafter referred to as "compound (1)") as a compound represented by the foregoing general formula (I) to be purified was added to 90 g of ion-exchanged water to prepare an aqueous solution. The compound (1) contained as impurities 500 ppm of sodium ion, 390 ppm of magnesium ion, 75 ppm of aluminum ion, 280 ppm of potassium ion, 220 ppm of calcium ion, 190 ppm of chromium ion, 340 ppm of manganese ion, 60 ppm of iron ion, 30 ppm of cobalt ion, 150 ppm of nickel ion, 50 ppm of copper ion, 320 ppm of zinc ion, 75 ppm of chloride ion, 40 ppm of nitrite ion, 140 ppm of nitrate ion, 470 ppm of sulfate ion, and 30 ppm of phosphate ion.

The foregoing aqueous solution was passed through the cation exchange column in 10 minutes, and then passed through the anion exchange column in 10 minutes. The aqueous solution which had been passed through these columns was then recovered. The solvent was then distilled off under reduced pressure to obtain 9.3 g of the compound (1) thus purified.

The foregoing compound (I) thus purified was then analyzed for content of impurities. As a result, the content of sodium ion, magnesium ion, aluminum ion, potassium ion, calcium ion, chromium ion, manganese ion, iron ion, cobalt ion nickle ion, copper ion, zinc ion, chloride ion, nitrite ion, nitrate ion, sulfate ion, and phosphate ion were all found to be not greater than 5 ppm. The analysis of impurities was carried out by inductively coupled plasma spectrometry (ICP) for metal ion or ion chromatography for anion.

A the foregoing colorant to be incorporated in the aqueous ink of the third invention there may be used the same material as in the aqueous ink of the first invention. The content of the foregoing colorant is the same as in the first invention.

The aqueous ink of the third invention comprises water incorporated therein as a main solvent. As water there may be used the same water as used in the aqueous ink of the first invention. The content of water in the aqueous ink of the third invention is the same as in the first invention.

The aqueous ink of the third invention may comprise various components described below incorporated therein, singly or in combination of two or more thereof, as necessary in addition to the foregoing various components (colorant, water as a main solvent, compound represented by the foregoing general formula (I)).

The aqueous ink of the third invention may comprise a light-resistance improver incorporated therein in combination with the compound represented by the foregoing general formula (I) for the purpose of further improving the light-resistance thereof. As the light-resistance improver there may be used the same as in the aqueous ink of the first invention. The content or the light-resistance improver in the aqueous ink of the second invention is the same as in the first invention.

The aqueous ink of the second invention preferably further comprises a penetration accelerator incorporated therein. As such a penetration accelerator there may be used the same compound as used in the aqueous ink of the first invention. The content of the penetration accelerator in the aqueous ink of the third invention is the same as in the first invention.

The aqueous ink of the third invention preferably further comprises a wetting agent made of a high boiling organic solvent incorporated therein. As the wetting agent made of a high boiling organic solvent there may be used the same material as used in the aqueous ink of the second invention. The content of the wetting agent is the same as in the second invention.

The aqueous ink of the third invention may further comprise various additives incorporated therein, singly or in combination of two or more thereof, as necessary. As these additives there may be used the same materials as used in the aqueous ink of the first invention.

As the preservative/mildewproofing agent to be incorporated in the aqueous ink of the third invention there may be used the same material as used in the aqueous ink of the first invention.

As the pH adjustor, dissolution aid and oxidation inhibitor to be incorporated in the aqueous ink of the third invention there may be used the same materials as used in the aqueous ink of the first invention.

As the surface tension adjustor to be incorporated in the aqueous ink of the third invention there may be used the same material as used in the aqueous ink of the second invention.

The aqueous ink of the third invention preferably exhibits a viscosity of not greater than 5 mPa.s at a temperature of 20° C. Examples of the method for adjusting the viscosity of the aqueous ink to the above defined range include a method which comprises adjusting the content of the foregoing various components to be incorporated in the aqueous ink, and a method which comprises adjusting the kind and content of the foregoing wetting agent made of a high boiling organic solvent. In particular, the latter method is preferred.

The aqueous ink of the third invention may be fairly used for any recording method which comprises attaching it, to a recording medium to effect printing similarly to the aqueous ink of the first invention. Examples of the recording method to which the aqueous ink of the third invention can be applied include those described previously.

The aqueous ink for ink jet recording according to the fourth invention will be further described hereinafter.

The aqueous ink of the fourth invention can be used in a recording method using an aqueous ink. Examples of the recording method using an aqueous ink include ink jet recording method, recording method using writing utensils such as pen, and various other printing methods. The aqueous ink of the fourth invention is preferably used in the ink jet recording method.

The aqueous ink of the fourth invention comprises a compound represented by the foregoing general formula (I) and a colorant incorporated therein and exhibits a surface tension of not greater than 40 mN/m as previously mentioned.

As the compound represented by the foregoing general formula (I) to be incorporated in the aqueous ink of the fourth invention there may be used the same compound as used in the aqueous ink of the first invention. The content of the compound represented by the general formula (I) is the same as in the first invention. In a preferred embodiment, the compound or general formula (I) is a compound represented by the foregoing general formula (II) as set forth in the first invention.

In a preferred embodiment of implication of the fourth invention as the substituents on the various groups represented by X in the foregoing general formula (I) there may be used lower alkyl groups (e.g., $C_1$–$C_6$ alkyl group), halogen atoms, etc. besides those described with reference to the first invention.

In a preferred embodiment of implication of the fourth invention, it is preferred that X represents an oxyradical group, aryloxy group, acyloxy group or hydroxyl group and $R^1$, $R^2$, $R^3$ and $R^4$ each represent an alkyl group. More preferably, $R^1$, $R^2$, $R^3$ and $R^4$ each are methyl group.

In a preferred embodiment of implication of the fourth invention, X is preferably an oxyradical group.

Further, the compound represented by the foregoing general formula (I) preferably has 20 or less carbon atoms.

Specific examples of the compound represented by the foregoing general formula (I) to be incorporated in the aqueous ink of the fourth invention will be given below, but the fourth invention is not limited thereto.

(1)
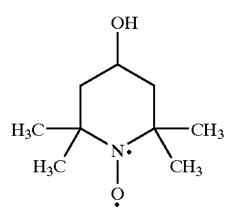
(2)
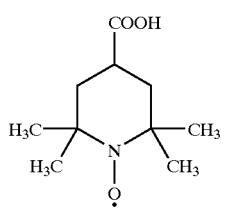
(3)
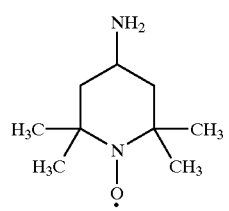
(4)
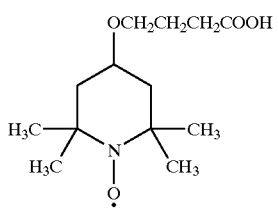
(5)
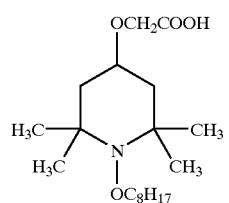
(6)
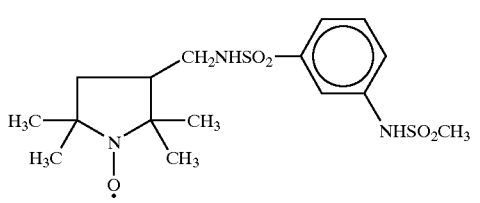
(7)
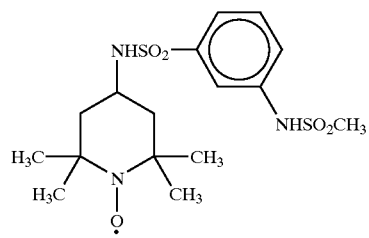
(8)
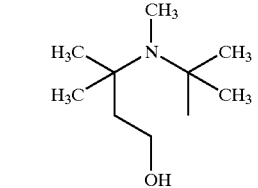
(9)
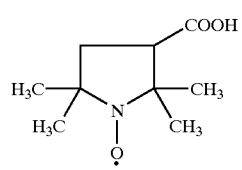
(10)
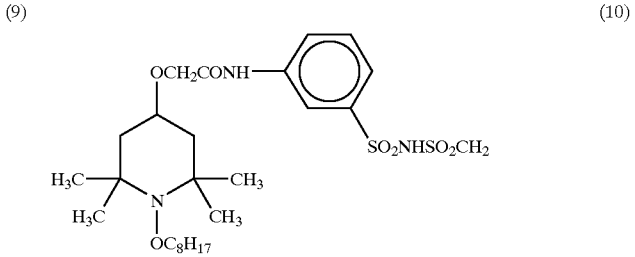
(11)
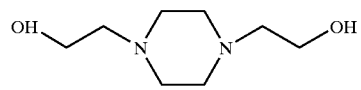
(12)
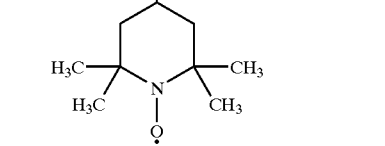
(13)
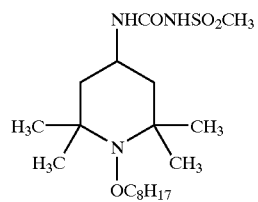
(14)
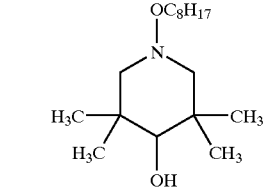

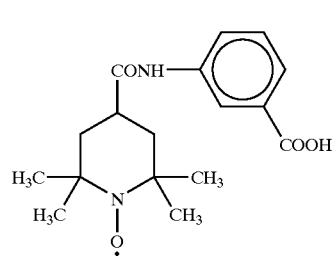
(15)
(16)
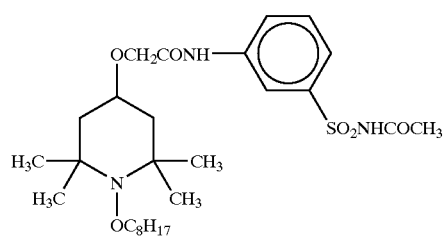
(17)
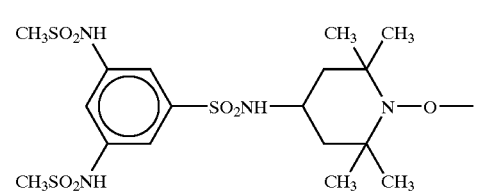
(18)
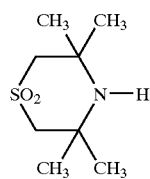
(19)
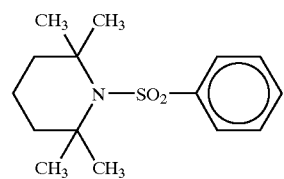
(20)
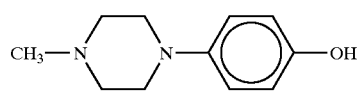
(21)
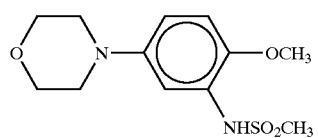
(22)
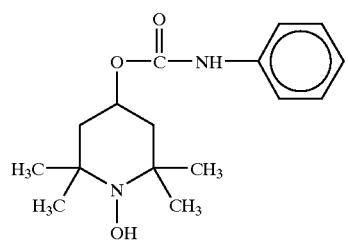
(23)
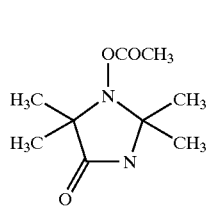
(24)

-continued

(25) 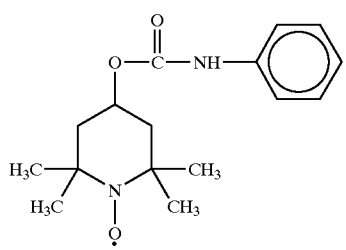

(26) 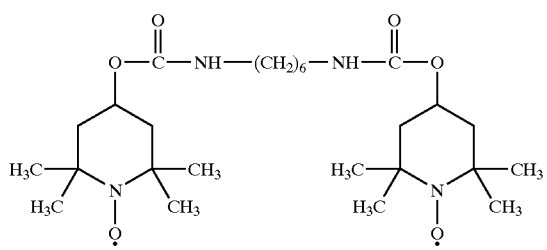

(27) 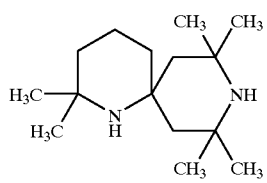

(28) 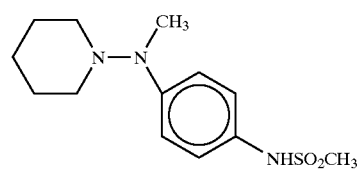

(29) 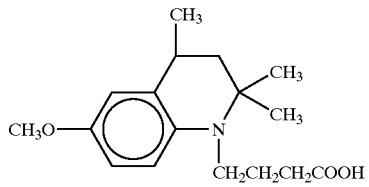

(30) 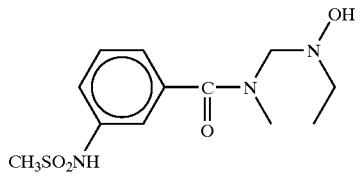

(31) 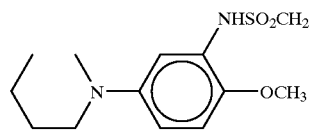

(32) 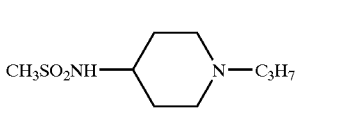

(33) 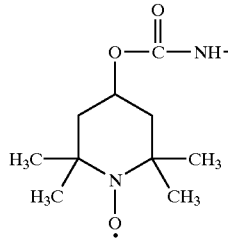 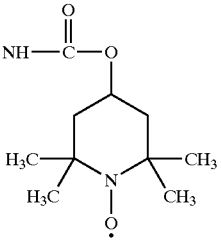

The aqueous ink of the fourth invention comprises any compounds selected from the group consisting of compounds represented by the foregoing general formula (I) incorporated therein. These compounds may be used singly or in combination of two or more thereof so far as they are selected from the foregoing group of compounds.

In the fourth invention, the surface tension of the aqueous ink is preferably not greater than 40 mN/m. The aqueous ink having a surface tension of not greater than 40 mN/m exhibits extremely good wetting properties and hence high penetrating properties with respect to the recording medium. In this arrangement, the resulting prints can be quickly dried. In other words, the aqueous ink of the fourth invention is advantageous in that the resulting prints have a good color development and a high quality image with little running can be obtained.

On the contrary, the aqueous ink having a surface tension of greater than 40 mN/m can hardly be bubbled. However, bubbles which have entered in the ink passage can be extremely difficulty discharged even when subjected to recovery by suction (cleaning). As a result, once the print stability has been impaired, the print quality can be hardly recovered.

However, when the surface tension of the aqueous ink of the fourth invention is extremely low, no ink meniscus can be formed in the nozzle portion depending on the properties of the ink. Accordingly, the surface tension of the aqueous ink of the fourth invention is preferably not greater than 40 mN/m, more preferably from 20 to 40 mN/m, even more preferably from 20 to 36 mN/m.

The measurement of the surface tension of the aqueous ink of the fourth invention can be normally accomplished by L. du Nouey's torus process (process which comprises determining from the pressure developed when a small platinum torus is pulled from the surface of the liquid with which it has been brought into horizontal contact) or L. Wilhelmy's vertical flat plate process (process which comprises determining from the force required for a thin square plate of glass or metal to be withdrawn from the liquid in which it has been vertically dipped at one side thereof). The surface tension of the aqueous ink of the fourth invention can be measured also by any other method such as capillary rise method, drop weight method, pendant drop method, vibrational jet method, sessile bubble method and maximum bubble pressure method. Among these methods, the vertical flat plate method can easily provide accurate values in a simple manner.

For example, the surface tension of the aqueous ink can be measured by means of a Type CBVP-2 automatic surface tensiometer (produced by Kyowa Interface Science Co., Ltd.) at an ambient temperature of 20° C., 50% RH and a liquid temperature of 20° C.

In a preferred embodiment of implication of the fourth invention, the aqueous ink may further comprise a penetration accelerator incorporated therein. As the penetration accelerator there may be used the same material as used in the first invention.

In a preferred embodiment of implication of the fourth invention, the aqueous ink may further comprise a surface active agent incorporated therein for the purpose of accelerating penetration and providing a good reliability in objection and a good image. Examples of the surface active agent employable herein include anionic surface active agents, nonionic surface active agents, and acetylene glycol-based surface active agents. In some detail, there may be used the same surface active agents as used in the second invention.

The added amount of the foregoing surface active agent, if incorporated in the aqueous ink of the fourth invention, may be properly predetermined. In practice, however, it is preferably from 0.1 to 5% by weight, more preferably from 0.5 to 2% by weight based on the aqueous ink.

As the foregoing colorant to be incorporated in the aqueous ink of the fourth invention there may be used either a dye or a pigment.

As these dyes there may be used various dyes for use in ordinary ink jet recording such as basic dye, disperse dye and vat dye besides those described with reference to the first invention.

The added amount of the foregoing dye, if used as a colorant for the aqueous ink of the fourth invention, is preferably from 0.1 to 20% by weight, more preferably from 0.5 to 10% by weight based on the aqueous ink.

On the other hand, as the foregoing pigment there may be used an inorganic or organic pigment without any special restrictions. Examples of the inorganic pigment employable herein include titanium oxide, iron oxide, and carbon black produced by known methods such as contact method, furnace method and thermal method. Examples of the organic pigment employable herein include azo pigments (eg., azo lake, insoluble azo pigment, condensed azo pigment, chelate azo pigment), polycyclic pigments (e.g., phthalocyanine pigment, perylene pigment, perynone pigment, anthraquinone pigment, quinacridone pigment, dioxazine pigment, thioindigo pigment, isoindolinone pigment, quinophlalone pigment), dye chelates (e.g., basic dye type chelate, acidic dye type chelate), nitro pigments, nitroso pigments, and aniline black.

Some colorants (e.g., azo dye) to be incorporated in the aqueous ink can undergo radical reaction to produce a gas such as nitrogen gas. When a compound represented by the foregoing general formula (I) is present in the aqueous ink as in the fourth invention, the compound can act as a radical polymerization inhibitor, making it possible to inhibit the production of nitrogen gas. As a result, the production of bubbles in the aqueous ink can be inhibited, making it possible to further stabilize the print stability of the aqueous ink.

The amount of the colorant, if it is a pigment, to be incorporated in the aqueous ink of the fourth invention is preferably from 0.2 to 25% by weight, more preferably from 1 to 15% by weight.

The main solvent to be incorporated in the aqueous ink of the fourth invention is preferably water or a mixture of water and a water-soluble organic solvent. As water there may be used the same water as used in the first invention.

The aqueous ink of the fourth invention preferably further comprises a wetting agent made of a high boiling organic solvent. As the wetting agent made of a high boiling organic solvent there may be used the same material as used in the second invention. Particularly preferred among these wetting agents are glycerin, diethylene glycol monobutyl ether, triethylene glycol monobutyl ether, diethylene glycol, and triethylene glycol. The content of these wetting agents is the same as in the second invention.

The aqueous ink of the fourth invention may comprise a water-soluble organic solvent incorporated therein as a water-soluble solvent as necessary besides the water mentioned above. The water-soluble organic solvent is preferably a low boiling organic solvent. Examples of such a low boiling organic solvent include methanol, ethanol, n-propyl alcohol, iso-propyl alcohol, n-butanol, sec-butanol, tert-butanol, iso-butanol, and n-pentanol. Particularly preferred among these solvents is monovalent alcohol. The low boiling organic solvent has an effect of reducing the drying time of ink.

The aqueous ink of the fourth invention may further comprises various additives incorporated therein, singly or in combination of two or more thereof, as necessary. As these additives there may be used the same materials as used in the aqueous ink of the first invention. In addition, a conductivity adjustor may be used.

As the preservative/mildewproofing agent to be incorporated in the aqueous ink of the fourth invention there may be used the same materials as used in the aqueous ink of the first invention.

As the pH adjustor, dissolution aid and oxidation inhibitor to be incorporated in the aqueous ink of the fourth invention there may be used the same materials as used in the aqueous ink of the first invention.

In the fourth invention, the foregoing other arbitrary components may be used singly or in admixture of two or more thereof in each of batches or from batch to batch.

In the fourth invention, the amount of all these components in the aqueous ink are predetermined such that the viscosity of the aqueous ink is less than 5 mPa.s at a temperature of 20° C.

The aqueous ink of the fourth invention is used in a recording method which comprises attaching it to a recording medium to effect printing.

In other words, in accordance with another embodiment of implication of the fourth invention, an ink jet recording method can be provided which comprises ejecting a droplet of the aqueous ink of the fourth invention so that it is attached to a recording medium to effect printing.

Further, in accordance with the fourth invention, a recorded matter obtained by this recording method can be provided.

EXAMPLES

Examples of the aqueous ink of the first Invention will be described hereinafter. However the first invention is not limited to these examples.

Examples A1 to A5 and Comparative Examples A1 and A2

Aqueous inks having the formulation set forth in Table 1 below were prepared. As a light-stabilizer there was used a compound represented by the following formula [ka-3].

TABLE 1

[ka-3]

(Structure: 2,2,6,6-tetramethyl-4-hydroxypiperidine-1-oxyl)

|  |  | Saturated vapor pressure[1] | Example A 1 | 2 | 3 | 4 | 5 | Comparative Example A 1 | 2 |
|---|---|---|---|---|---|---|---|---|---|
| Colored substance | C.I. Direct Yellow 132 | Solid | 3 | | | | | | |
|  | C.I. Direct Red 249 | Solid | | 4 | | | 4 | | 4 |
|  | C.I. Direct Yellow 86 | Solid | | | 2.5 | | | 2.5 | |
|  | Project Fast Black 2[*2] | Solid | | | | 4 | | | |
| Solvent | Glycerin | <0.1 Pa | 13 | | | 8 | | | |
|  | Triethylene glycol | <1 Pa | | 25 | | 2 | 25 | | 40 |
|  | 1,5-Pentanediol | <1 Pa | | | 5 | | | 4 | |
|  | Ethylene glycol | 7 Pa | | | 14 | | | 14 | |
|  | 2-Pyrrolidone | ≧20 Pa | | | | 3 | | | |
|  | Orfin E1010[*3] | *5 | 1 | 2 | | 1 | 2 | | 2 |
|  | Surfinol 104[*4] | Solid | | | 0.3 | | | 0.3 | |
|  | Triethylene glycol monobutyl ether | 1 Pa | | 8 | | | 8 | | 8 |
|  | Propylene glycol monomethyl ether | 1.2 kPa | | | 5 | | | 5 | |
|  | Diethylene glycol monobutyl ether | 3 Pa | 10 | | | 9 | | | |
| Light-stabilizer (1) (compound represented by the general formula [ka-3]) | | Solid | 4 | 0.4 | 5 | 12 | 0.3 | 4 | 0.4 |
| pH adjustor | Triethanolamine | 1 Pa | | | | 1 | | | |
|  | Potassium hydroxide | Solid | | | | 0.1 | | | |
| Preservative | Proxel XL-2[*2] | 1.3 kPa | 0.3 | 0.3 | 0.3 | 0.3 | 0.3 | 0.3 | 0.3 |
| Water |  | 2.4 kPa | Balance | Balance | Balance | Balance | Balance | Balance | Balance |
| Total amount of solvents having saturated vapor pressure of not higher than 1.7 Pa (2) |  |  | 14 | 35 | 5 | 11 | 35 | 4 | 50 |
| Ratio of (1) to (2) (with (1) as 1) |  |  | 1:3.5 | 1:87.5 | 1:1 | 1:0.92 | 1:117 | 1:1 | 1:125 |

[1]saturated vapor pressure at 20° C.;
[*2]produced by AVECIA INC.;
[*3]produced by Nissin Chemical Industry Co., Ltd.;
[*4]produced by Air Product and Chemicals Inc.;
[*5]Not recognized to be evaporated at 20° C.

Evaluation of Light-resistance and Reliability in Election

The aqueous inks of Examples A1 to A5 and Comparative Examples A1 and A2 were each evaluated for light-resistance and reliability in ejection according to the following criterion. The results are set forth in Table 2 below.

Criterion for Evaluation of Light-resistance

An ink cartridge loaded with the aqueous ink was mounted on an ink jet printer (trade name: PM-800C, produced by SEIKO EPSON CORP.). With the applied duty being adjusted such that OD (optical density) ranges from 0.9 to 1.1, solid printing was made on an evaluating paper (trade name: Premium Glossy Photo paper, produced by SEIKO EPSON CORP.) to prepare a printed matter. The printed matter thus prepared was then allowed to stand at ordinary temperature for 3 days. Using a Type C; 5000 xenon weatherometer (produced by ATLAS ELECTRIC DEVICES COMPANY), the printed matter was then exposed to light having an illuminance of 0.18 W/m² at 340 nm, a temperature of 24° C., a relative humidity of 60% RH, a black panel temperature of 35° C., and 60,000 lux.

The printed matter was measured for OD before and after exposure to light using a Type SPM-100-II reflection densitometer (produced by Gretag—The Imaging Company). Substituting these measurements for D and $D_0$ in the following equation gives percent residue of optical density (ROD). These results were then evaluated according to the following criterion.

% ROD=$(D/D_0) \times 100$ wherein

D: OD after exposure to light $D_0$: OD before exposure to light

Criterion of Evaluation

A: ROD is not smaller than 90%; good light-resistance

B: ROD is from not smaller than 80% to less than 90%; practically no problems

C: ROD is from not smaller than 70% to less than 80%; appreciable

NG: ROD is less than 70% practically unusable

Criterion of Evaluation of Reliability in Ejection

Similarly to the foregoing criterion of evaluation of light-resistance, an ink cartridge loaded with the ink composition was mounted on the ink jet printer PM-800C. It was then confirmed that the ink composition had been normally ejected in the initial stage. The printer PM-800C was then switched off. With the ink cartridge left mounted thereon, the printer was then allowed to stand at a temperature of 40° C. and a relative humidity at 20% RH. After being allowed to stand under these conditions for a predetermined period of time, PM-800C was then moved to ordinary temperature atmosphere. When the temperature of the main body of PM-800C was lowered to ordinary temperature, the main body of PM-800C was switched on. The ink composition was then ejected. The ejection condition was visually observed. When the ink composition was not normally ejected, PM-800C was then subjected to cleaning for recovery in a predetermined manner. The number of times of cleaning operation required until the ink composition was normally ejected again was examined. The results were then evaluated according to the following criterion.

| Criterion of evaluation |
|---|
| A: Normally ejected without cleaning or after one cleaning operation |
| B: Normally ejected after two or three cleaning operations |
| C: Normally ejected after 4 or 6 cleaning operations |
| NG: Not normally ejected even after 6 cleaning operations |

| Formulation of aqueous ink 1 | |
|---|---|
| Colorant: C.I. Acid Red 82 | 2.5% |
| Solvent: Glycerin | 15.0% |
| Light-stabilizer: Compound represented by the general formula [ka 18] | 1.0% |
| Surface active agent: Orfin E1010 (produced by Nissin Chemical Industry Co., Ltd.) | 1.3% |
| Penetration accelerator: Triethylene glycol monobutyl ether | 9.0% |
| Water | Balance |
| Total | 100% |

[ka-18]

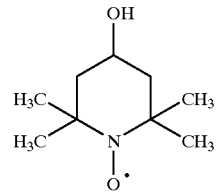

TABLE 2

| | | Light-resistance Time of exposure to light | | | | Reliability in ejection Time of storage | | |
|---|---|---|---|---|---|---|---|---|
| | | 4 days | 8 days | 12 days | 16 days | 1 month | 2 months | 4 months |
| Example A | 1 | A | A | A | B | A | A | B |
| | 2 | A | A | B | B | A | A | A |
| | 3 | A | A | A | B | B | B | B |
| | 4 | A | A | B | B | A | B | C |
| | 5 | A | B | B | C | A | A | A |
| Comparative Example A | 1 | A | A | A | B | B | NG | — |
| | 2 | B | C | NG | — | A | A | A |

As can be seen in the results shown in Table 2 above, all the aqueous ink of Examples A1 to A5 exhibit an excellent light-resistance as well as a high storage stability and an excellent reliability in ejection. On the contrary, it can be seen that all the aqueous ink of Comparative Examples A1 and A2 are not on practical sufficient level (C or higher) in any of light resistance and reliability in ejection.

The aqueous ink of Comparative Example A1 contains a small amount (4% by weight) of a solvent having a saturated vapor pleasure of not higher than 1.7 Pa at a temperature of 20° C. and thus exhibits a deteriorated storage stability and reliability in ejection. Further, the aqueous ink of Comparative Example A2 contains a large amount (50% by weight) of a solvent having a saturated vapor pressure of not higher than 1.7 Pa at a temperature of 20° C. and thus exhibits a deteriorated light-resistance.

Examples of the aqueous ink of the second invention will be described hereinafter. However the second invention is not limited the following examples.

Example B1

The aqueous ink 1 having the following formulation was prepared. As a light-stabilizer (compound represented by the foregoing general formula (I)) there was used a compound represented by formula [ka-18] shown below.

Example B2

An aqueous ink 2 was prepared in the same manner as in Example B1 except that C. I. Acid Yellow 7 was used instead of C. I. Acid Red B82.

Example B3

An aqueous ink 3 was prepared in the same manner as in Example B1 except that the compound represented by the general formula [ka-8] was used in an amount of 0.8% instead of C. I. Acid Red 82 .

Comparative Example B1

An aqueous ink 4 was prepared in the same manner as in Example B1 except that as a colorant which doesn't belong to the colorant according to the present invention there was used C. I. Direct Black 22 instead of C. I. Acid Red 82.

Comparative Example B2

An aqueous ink 5 was prepared in the same manner as in Example B1 except that as a colorant which doesn't belong to the colorant according to the present invention there was used C. I. Acid Yellow 98 instead of C. I. Acid Red 82.

The aqueous inks 1 to 5 thus prepared were each subjected to solid printing on an evaluating paper using an ink jet printer to prepare printed matters 1 to 5. As the ink jet printer there was used a Type PM-800C printer (produced by SEIKO EPSON CO., LTD.). The applied duty was adjusted such that OD (optical density) ranged from 0.9 to 1.1. As the evaluating paper there was used Premium Glossy Photo paper (produced by SEIKO EPSON CO., LTD.).

The printed matters 1 to 5 thus obtained were each evaluated for light-resistance according to the following method using percent drop of optical density. The results are set forth in Table 3.

Evaluation by Percent Drop of Optical Density

The printed matters 1 to 5 were each allowed to stand at ordinary temperature indoor for 3 days. Using A Type C;5000 xenon weatherometer (produced by ATLAS ELECTRIC DEVICES COMPANY), the printed matters were each then exposed to light having an illuminance of 0.18 W/m² at 340 nm, a temperature of 24° C., a relative humidity of 60% RH, a black panel temperature of 35° C., and 60,000 lux. The printed matters were each measured for OD before and after exposure to light using a Type SPM-100-II reflection densitometer (produced by Gretag—The Imaging Company). Substituting these measurements for D and $D_0$ in the following equation gives percent drop of optical density (LOD).

$$\% \text{ LOD} = (1 - D/D_0) \times 100$$

wherein

D: OD after exposure to light $D_0$: OD before exposure to light

As controls for the aqueous inks 1 to 5 there were prepared inks free of light-stabilizer (compound represented by the foregoing general formula (A)). Using these controls, comparative printed matters 1 to 5 were prepared in the same printing manner as mentioned above. The comparative printed matters 1 to 5 thus prepared were each then exposed to light in the same manner as mentioned above. The measurements were then substituted for D and $D_0$ in the foregoing equation to determine the percent drop of optical density (C-LOD) of the controls.

LOD of the printed matters 1 to 5 were converted to value with that of the comparative printed matters 1 to 5 as 1, respectively. The results were then evaluated according to the following criterion.

| Criterion of evaluation |
|---|
| A: Converted value is not greater than 0.5 |
| B: Converted value is from greater than 0.5 to not greater than 0.67 |
| C: Converted value is from greater than 0.67 to not greater than 1 |
| D: Converted value is greater than 1 |

TABLE 3

| | Colorant | Light-resistance |
|---|---|---|
| Example B | 1 C. I. Acid Red 82 | A |
| | 2 C. I. Acid Yellow 7 | A |
| | 3 Compound represented by the general formula [ka-8] | A |
| Comparative Example B | 1 C. I. Direct Black 22 | B |
| | 2 C. I. Acid Yellow 98 | B |

As can be seen in the results shown in Table 3, the printed matters 1 to 3 obtained in Examples B1 to B3 exhibit an excellent effect of improving light-resistance as compared with the printed matters 4 and 5 obtained in Comparative Examples B1 and B2. In other words, it is made obvious that the aqueous ink used in Examples B exhibits an excellent effect of improving light-resistance compared with that used in Comparative Examples B.

Examples of the aqueous ink of the third invention will be described hereinafter. However, the third invention is not limited to the following examples.

Examples C1 to C4 and Comparative Examples C1 to C4

Aqueous inks having the formulation set forth in Table 4 (Examples C1 to C4) and Table 5 (Comparative Examples C1 to C4) below were prepared. As a light-stabilizer there was used a compound represented by the following formula [ka-3].

TABLE 4

[ka-3]

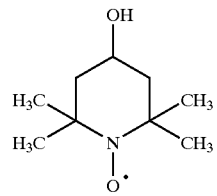

| | | Metal ion and metal (ppm) | Polyvalent metal ion*⁴ (ppm) | Anion (ppm) | Example C 1 | 2 | 3 | 4 |
|---|---|---|---|---|---|---|---|---|
| Colorant | C.I. Direct Yellow 132 | — | — | — | 3 | | | |
| | C.I. Direct Red 249 | — | — | — | | 4 | | |
| | C.I. Direct Yellow 86 | — | — | — | | | 2.5 | |
| | Project Fast Black 2*¹ | — | — | — | | | | 4 |
| Solvent | Glycerin | — | — | — | 13 | | | 8 |
| | Triethylene glycol | — | — | — | | 30 | | 2 |
| | 1,5-Pentanediol | — | — | — | | | 4 | |
| | Ethylene glycol | — | — | — | | | 14 | |
| | 2-Pyrrolidone | — | — | — | | | | 3 |
| Surface active agent | Orfin E1010*² | — | — | — | 1 | 2 | | 1 |
| | Surfinol 104*³ | — | — | — | | | 0.3 | |

TABLE 4-continued

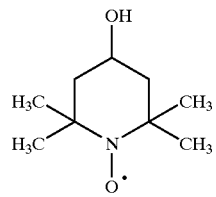

[ka-3]

| | | Metal ion and metal (ppm) | Polyvalent metal ion*4 (ppm) | Anion (ppm) | Example C 1 | 2 | 3 | 4 |
|---|---|---|---|---|---|---|---|---|
| Penetration accelerator | Diethylene glycol monobutyl ether | — | — | — | 10 | | | 9 |
| | Triethylene glycol monobutyl ether | — | — | — | | 8 | | |
| | Propylene glycol monomethyl ether | — | — | — | | | 5 | |
| Light-stabilizer | Compound represented by the general formula [ka-3] | 310 950 1,100 | (200) (800) (900) | 290 700 1,200 | 4 | 0.14 | 5 | 12 |
| Preservative | Proxel XL-2*1 | — | — | — | 0.3 | 0.3 | 0.3 | 0.3 |
| Water | | — | — | — | Balance | Balance | Balance | Balance |

*1 produced by AVECIA INC.;
*2 produced by Nissin Chemical Industry Co., Ltd.;
*3 produced by Air Product and Chemicals Inc.;
*4 content in metal ion

TABLE 5

| | | Metal ion and metal (ppm) | Polyvalent metal ion*4 (ppm) | Anion (ppm) | Comparative Example C 1 | 2 | 3 | 4 |
|---|---|---|---|---|---|---|---|---|
| Colorant | C.I. Direct Yellow 132 | — | — | — | 3 | | | |
| | C.I. Direct Red 249 | — | — | — | | 4 | | |
| | C.I. Direct Yellow 86 | — | — | — | | | 2.5 | |
| | Project Fast Black 2*1 | — | — | — | | | | 4 |
| Solvent | Glycerin | — | — | — | 13 | | | 8 |
| | Triethylene glycol | — | — | — | | 20 | | 2 |
| | 1,5-Pentanediol | — | — | — | | | 4 | |
| | Ethylene glycol | — | — | — | | | 14 | |
| | 2-Pyrrolidone | — | — | — | | | | 3 |
| Surface active agent | Orfin E1010*2 | — | — | — | 1 | 2 | | 1 |
| | Surfinol 104*3 | — | — | — | | | 0.3 | |
| Penetration accelerator | Diethylene glycol monobutyl ether | — | — | — | 10 | | | 9 |
| | Triethylene glycol monobutyl ether | — | — | — | | 6 | | |
| | Propylene glycol monomethyl ether | — | — | — | | | 5 | |
| Light-stabilizer | Compound represented by the general formula [ka-3] | 310 950 1,100 | (200) (800) (900) | 290 700 1,200 | 4 | 0.4 | 5 | 12 |
| Preservative | Proxel XL-2*1 | — | — | — | 0.2 | 0.3 | 0.3 | 0.3 |
| Water | | — | — | — | Balance | Balance | Balance | Balance |

*1 produced by AVECIA INC.;
*2 produced by Nissin Chemical Industry Co., Ltd.;
*3 produced by Air Product and Chemicals Inc.;
*4 content in metal ion Evaluation of Liquid Stability an Light-resistance The aqueous inks of Examples C1 to C4 and Comparative Examples C1 to C4 were each then evaluated for liquid stability and light-resistance according to the following methods. The results are set forth in Table 6 below.

Criterion of Evaluation of Liquid Stability

An ink cartridge loaded with the ink composition was mounted on a Type PM-800C ink jet printer (produced by SEIKO EPSON CO., LTD.). It was then confirmed that the aqueous ink composition had been normally ejected in the initial stage. The printer PM-800C was then switched off. With the ink cartridge left mounted thereon, the printer was then allowed to stand at a temperature of 40° C. and a relative humidity of 20% RH. After being allowed to stand under these conditions for a predetermined period of time PM-800C was then moved to ordinary temperature atmosphere. When the temperature of the main body of PM-800C was lowered to ordinary temperature, the main body of PM-800C was switched on. The aqueous ink was then ejected. The ejection condition was visually observed. When the aqueous ink was not normally ejected, PM-800C was then subjected to cleaning for recovery in a predetermined manner. The number of times of cleaning operation required until the ink composition was normally elected again was examined. The results were then evaluated according to the following criterion.

| Criterion of evaluation |
|---|
| A: Normally ejected without cleaning or after one cleaning operation |
| B: Normally ejected after two or three cleaning operations |
| C: Normally ejected after 4 or 6 cleaning operations |
| NG: Not normally ejected even after 6 cleaning operations | similarly to those of Examples C1 to C4 because they contain some amount of the compound represented by the general formula [ka-3] as a light-stabilizer, they exhibit a deteriorated liquid stability and storage stability and thus can easily cause clogging of nozzle because the purity of the foregoing compound [ka-3] is low.

Examples of the aqueous ink of the fourth invention will be described hereinafter. However, the fourth invention is not limited to the following examples.

Examples D1 to D5 and Comparative Examples D1 to D3

Preparation of Ink Composition

Aqueous inks 1 to 8 having the formulation set forth in Table 7 below were prepared. The aqueous inks 1 to 5 are according to the fourth invention, and the aqueous inks 6 to 8 are comparative.

As the compound represented by the foregoing general formula (I) there was used a compound represented by the following formula (a) (commercially available product, e.g., commercially available from Aldrich Inc.).

TABLE 6

|  |  | Liquid stability Time of storage |  |  |  |  | Light-resistance Time of exposure to light |  |  |  |
|---|---|---|---|---|---|---|---|---|---|---|
|  |  | 1 month | 2 months | 4 months | 6 months | 9 months | 12 months | 4 days | 8 days | 12 days | 16 days |
| Example C | 1 | A | A | A | B | B | C | A | A | A | B |
|  | 2 | A | A | A | A | B | B | A | A | B | B |
|  | 3 | A | B | B | B | B | C | A | A | A | B |
|  | 4 | A | A | B | B | C | C | A | A | B | B |
| Comparative Example C | 1 | A | A | B | C | C | NG | A | A | A | B |
|  | 2 | A | A | A | B | C | NG | A | A | B | B |
|  | 3 | B | B | B | C | NG | — | A | A | A | B |
|  | 4 | A | B | C | NG | — | — | A | A | B | B |

As can be seen in the results shown in Table 6, all the aqueous inks of Examples C1 to C4 exhibit an excellent light-resistance as well as a high liquid stability and an excellent storage stability. These aqueous inks don't cause nozzle clogging and thus have a high reliability. On the contrary, although the aqueous inks of Comparative Examples C1 to C4 exhibit an excellent light-resistance

TABLE 7

(α)

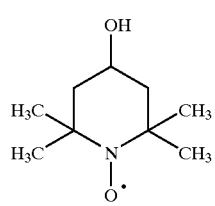

| | | Ink composition (unit wt-%) | | | | | | | |
|---|---|---|---|---|---|---|---|---|---|
| | | 1 | 2 | 3 | 4 | 5 | 6 | 7 | 8 |
| Compound of the general formula (α) | | 2 | 4 | 0.1 | 10 | 0.3 | | 0.1 | |
| Colorant | C.I. Direct Yellow 132 | 3 | | | | | | | |
| | C.I. Direct Red 249 | | 4 | | | | 4 | | |
| | C.I. Acid Red 52 | | | | | 4 | | | 4 |
| | C.I. Direct Yellow 86 | | | 2.5 | | | | 2.5 | |
| | Project Fast Black 2 (produced by AVECIA INC.) | | | | 4 | | | | |
| Organic solvents | Glycerin | 10 | 5 | | 8 | | 5 | | |

TABLE 7-continued (α)

$$\text{structure: 4-hydroxy-2,2,6,6-tetramethylpiperidine-1-oxyl}$$

(A piperidine ring with OH at the 4-position, four CH$_3$ groups at 2,2,6,6 positions, and N–O• at position 1)

| | | Ink composition (unit wt-%) | | | | | | | |
|---|---|---|---|---|---|---|---|---|---|
| | | 1 | 2 | 3 | 4 | 5 | 6 | 7 | 8 |
| | Triethylene glycol | | 10 | | 2 | 30 | 10 | | 30 |
| | 1,5-Pentanediol | | | 5 | | | | 5 | |
| | 2-Pyrrolidone | | | | 3 | | | | |
| | Diethylene glycol monobutyl ether | 10 | | | 9 | | | | |
| | Triethylene glycol monobutyl ether | | 8 | | | 10 | 8 | | 12 |
| | Propylene glycol monomethyl ether | | | 5 | | | | | |
| | Orfin E1010 (produced by Nissin Chemical Industry Co., Ltd.) | 1 | 2 | | 1 | | 2 | | |
| | Orfin STG (produced by Nissin Chemical Industry Co., Ltd.) | | | 0.3 | | | | | |
| | Ethanol | | | | | 6 | | | 2 |
| pH adjustor | Potassium hydroxide | | | | 0.1 | | | | |
| | Triethanolamine | | | | 1 | | | | |
| Preservative | Proxel XL-2 (produced by AVECA INC.) | 0.3 | 0.3 | 0.3 | 0.3 | 0.3 | 0.3 | 0.3 | 0.3 |
| | Water | Balance | Balance | Balance | Balance | Balance | Balance | Balance | Balance |
| Surface tension (mN/π) | | 33 | 30 | 36 | 29 | 38 | 30 | 50 | 42 |

Evaluation Test

The various aqueous inks thus prepared were each evaluated for print stability, image quality and light-resistance according to the following evaluation testing methods (A) to (C), respectively (A) Print Stability Evaluation Test Ink cartridges loaded with the various aqueous inks thus prepared were each mounted on a Type PM-800C ink jet printer (produced by SEIKO EPSON CO., LTD.). Continuous printing was made on 3,000 sheets of A4 size paper according to the following print pattern and printing procedure. Thus, average number of sheets on which continuous printing can be made without any print defects (disturbance, loss and deflection of dot) was determined. The results were then judged according to the following criterion.

Print Pattern:

A print pattern having half-width English characters and symbolic letters arranged at random such that the number of printed dots reaches about 12.5% of the maximum printable number of dots in the printing range was used. As printed dot there was used one for 360 DPI (=Dol per inch).

Printing Procedure:

Printing was effected according to the following procedures (1) and (2).

(1) When printing defects (disturbance, loss or deflection of dot) occur during printing, printing is suspended. Cleaning is then conducted for recovery. When recovery requires plural cleaning operations, the plural cleaning operations are regarded in combination as one defect. Thus, continuous painting is resumed.

(2) When printing is suspended due to exhaustion of ink from the ink cartridge, or when printing defects occur obviously due to exhaustion of ink, no count is made. Thus, the ink cartridge is then immediately renewed to resume printing.

| Evaluation A: | Average continuously printable number of sheets is not smaller than 600; very good |
|---|---|
| Evaluation B: | Average continuously printable number of sheets is not smaller than 300; practically no problems |
| Evaluation C: | Average continuously printable number of sheets is not smaller than 150; practically usable |
| Evaluation D: | Average continuously printable number of sheets is less than 150; practically unusable |

(B) Evaluation of Image Quality

Ink cartridges loaded with the various aqueous inks were mounted on the ink jet printer PM-800C. Images were then printed on an evaluating paper (Premium Glossy Photo paper, produced by SEIKO EPSON CO., LTD.) in such an arrangement that solid area of green (cyan+yellow), red (magenta+yellow), blue (cyan+magenta) and black were adjacent to each other. The portion at which these color solid areas were adjacent to each other (border) was then judged according to the following criterion.

| Evaluation A: | Sharp border, very good |
|---|---|
| Evaluation B: | Definite border, good |
| Evaluation C: | Slightly blurred border, pratically usable |
| Evaluation D: | Disturbed border, pratically unusable |

(C) Light-resistance Evaluation Test

Ink cartridge loaded with the various aqueous inks were each mounted on the ink jet printer PM-800C. With the applied duty being adjusted such that OD (optical density) ranges from 0.9 to 1.1, solid printing was made on an evaluating paper (trade name: PM photographic paper, produced by SEIKO EPSON CORP.) to prepare a printed matter. The printed matter thus prepared was then allowed to stand at ordinary temperature for 3 days. Using a Type C;5000 xenon weatherometer (produced by ATLAS ELECTRIC DEVICES COMPANY), the printed matter was then exposed to light having an illuminance of 0.18 W/m² at 340 nm, a temperature of 24° C., a relative humidity of 60% RH, a black panel temperature of 35° C., and 60,000 lux.

The printed matter was measured for OD before and after exposure to light using a Type SPM-100-II reflection densitometer (produced by Gretag—The Imaging Company). Substituting these measurements for D and $D_0$ in the following equation gives percent residue of optical density (ROD). These results were then evaluated according to the following criterion.

% ROD=$(D/D_0) \times 100$ wherein
D: OD after exposure to light
$D_0$ OD before exposure to light

| | |
|---|---|
| Evaluation A: | ROD is not smaller than 90%; good light-resistance |
| Evaluation B: | ROD is from not smaller than 80% to less than 90%; practically no problems |
| Evaluation C: | ROD is from not smaller than 70% to less than 80%; appreciable |
| Evaluation D: | ROD is less than 70%; practically unusable |

The results are as set forth in Table 8 below.

TABLE 8

| | Ink composition | | | | | | | |
|---|---|---|---|---|---|---|---|---|
| | 1 | 2 | 3 | 4 | 5 | 6 | 7 | 8 |
| Evaluation of print stability | A | A | B | B | C | A | D | C |
| Evaluation of image quality | A | A | B | A | C | A | D | D |
| Evaluation of light-resistance 4 days | A | A | A | A | A | B | A | B |
| 8 days | A | A | B | A | B | C | B | C |
| 12 days | B | A | B | A | B | D | B | D |
| 16 days | B | B | C | B | B | D | C | D |

Embodiments of implication of the first to fourth inventions include the following embodiments (1) to (19).

(1) The aqueous ink (first invention), further comprising a penetration accelerator incorporated therein.

(2) The aqueous ink, which is adapted for use in ink jet recording process.

(3) The aqueous ink, which is adapted for use in on-demand type ink jet recording process.

(4) The aqueous ink (second invention), further comprising a penetration accelerator incorporated therein.

(5) The aqueous ink, wherein as said penetration accelerator there is used a lower alkyl ether of polyvalent alcohol.

(6) The aqueous ink, further comprising a surface active agent incorporated therein.

(7) The aqueous ink, wherein as said surface active agent there is used an acetylene glycol-based surface active agent.

(8) The aqueous ink, which is adapted for use in ink jet recording process.

(9) The aqueous ink, which is adapted for use in on-demand type ink jet recording process.

(10) The aqueous ink (third invention), wherein said colored substance is a dye or pigment.

(11) The aqueous ink, further comprising a surface active agent incorporated therein.

(12) The aqueous ink, which is adapted for use in ink jet recording process.

(13) The aqueous ink, which is adapted for use in on-demand type ink jet recording process.

(14) The aqueous ink (fourth invention), wherein said compound represented by the general formula (I) is contained in an amount of from 0.05 to 10% by weight based on the weight of the aqueous ink.

(15) The aqueous ink, wherein as said water-soluble organic solvent there is used a lower alcohol ether of polyvalent alcohol.

(16) The aqueous ink, further comprising a surface active agent incorporated therein.

(17) The aqueous ink, further comprising an acetylene glycol-based surface active agent as a surface active agent.

(18) A recording method which comprises attaching an aqueous ink according to any one of the first to fourth inventions to a recording medium to effect printing.

(19) An ink jet recording method which comprises ejecting a droplet of an aqueous ink according to any one of the first to fourth inventions so that it is attached to a recording medium to effect printing.

While the present invention has been described in detail and with reference to specific examples thereof, it will be apparent to one skilled in the art that various changes and modifications can be made therein without departing from the spirit and scope thereof.

What is claimed is:

1. An aqueous ink comprising at least a colorant, a water-soluble organic solvent and a compound represented by general formula (I) shown below, wherein said water-soluble organic solvent stays liquid at a temperature of not higher than 40° C., exhibits a water solubility of not lower than 1% by weight at a temperature of 20° C. and a saturated vapor pressure of not higher than 1.7 Pa at a temperature of 20° C. and is contained in an amount of from 5 to 35% by weight; wherein the weight ratio of content of said compound represented by general formula (I) to said water-soluble organic solvent is from 1:1 to 1:100; and wherein said water-soluble organic solvent comprises at least one compound selected from the group consisting of glycerin, 1,5-pentanediol and triethylene glycol:

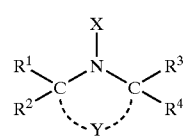

(I)

wherein Y represents a nonmetallic atom group required to form a 5- to 7-membered ring with C and N; X represents, an oxyradical group, and R1 to $R^4$ may be the same or different and each represents a hydrogen atom or alkyl group, with the proviso that any two of $R^1$ to $R^4$ and Y may be connected to each other to form a 5- to 7-membered ring.

2. The aqueous ink according to claim 1, wherein said compound represented by the general formula (I) is a compound represented by the following general formula (II) having a water-soluble group W:

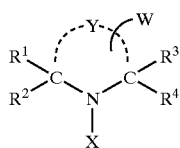

(II)

wherein W represents —OH group, —SO₃H group, —SO₂NH—(R) group, phenolic hydroxyl group, —CON(R)—OH group or —COOH group wherein R represents H or alkyl group.

3. The aqueous ink according to claim 1, wherein a heterocycle is formed by C, N and Y in general formula (I) wherein the heterocycle is a 6-membered ring.

4. An aqueous ink comprising at least a colorant, water as a main solvent and a compound represented by general formula (I) shown below, wherein said colorant is a colored substance free of azo group:

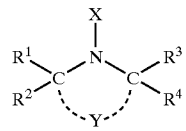

(I)

wherein Y represents a nonmetallic atom group required to form a 5- to 7-membered ring with C and N; X represents, an oxyradical group, and R¹ to R⁴ may be the same or different and each represent a hydrogen atom or alkyl group, with the proviso that any two of R¹ to R¹ and Y may be connected to each other to form a 5- to 7-membered ring.

5. The aqueous ink according to claim 4, wherein said compound represented by general formula (I) is a compound represented by general formula (II) having a water-soluble group W:

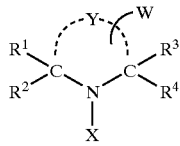

(II)

wherein W represents —OH group, —SO₃H group, —SO₂NH—(R) group, phenolic hydroxyl group, —CON(R)—OH group or —COOH group wherein R represents H or alkyl group.

6. The aqueous ink according to claim 4, wherein said colored substance free of azo group comprises at least one compound selected from the group consisting of anthraquinones, indigoids, phthalocyanines, carboniums, quinonimines, methines, quinolines, nitros, nitrosos, benzoquinones, naphthoquinones, naphthalimides, and perinones.

7. The aqueous ink according to claim 4, wherein said colored substance free of azo group is represented by the following general formula (A):

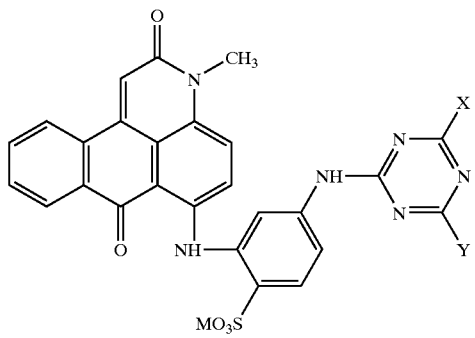

(A)

wherein X represents an anilino group substituted by at least one SO₃M; Y represents OH, Cl or morpholino group; and M represents H, Li, Na, K, ammonium or organic amine.

8. The aqueous ink according to claim 4, wherein the weight ratio of content of said colored substance free of azo group to said compound represented by general formula (I) is from 4:1 to 1:10.

9. The aqueous ink according to claim 4, wherein a heterocycle is formed by C, N and Y in the general formula (I) wherein the heterocycle is a 6-membered ring.

10. An aqueous ink comprising at least a colorant, water as a main solvent and a compound represented by general formula (I) shown below, wherein the total content of metals and metal ions contained in the compound represented by general formula (I) is not greater than 1,000 ppm:

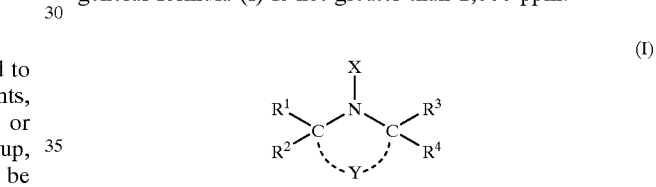

(I)

wherein Y represents a nonmetallic atom group required to form a 5- to 7-membered ring with C and N; X represents an oxyradical group, and R¹ to R⁴ may be the same or different and each represent a hydrogen atom or alkyl group, with the proviso that any two of R¹ to R⁴ and Y may be connected to each other to form a 5- to 7-membered ring.

11. The aqueous ink according to claim 10, wherein said compound represented by general formula (I) is a compound represented by general formula (II) having a water-soluble group W:

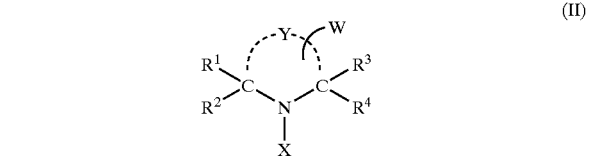

(II)

wherein W represents —OH group, —SO₃H group, —SO₂NH—(R) group, phenolic hydroxyl group, —CON(R)—OH group or —COOH group wherein R represents H or alkyl group.

12. The aqueous ink according to claim 10, wherein the total content of metal ions having a valence of two or more in said metal ions is not greater than 800 ppm.

13. The aqueous ink according to claim 10, wherein the total content of metals is not greater than 200 ppm.

14. The aqueous ink according to claim 10, wherein the total content of anions contained in the compound represented by the general formula (I) is not greater than 1,000 ppm.

15. The aqueous ink according to claim 10, wherein a heterocycle is formed by C, N and Y in the general formula (I) wherein the heterocycle is a 6-membered ring.

16. An aqueous ink for ink jet recording comprising a compound represented by general formula (I) shown below and a colorant, wherein the surface tension thereof is not greater than 40 mN/m:

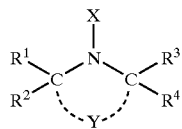
(I)

wherein Y represents a nonmetallic atom group required to form a 5- to 7-membered ring with C and N; X represents an oxyradical group, and $R^1$ to $R^4$ may be the same or different and each represent a hydrogen atom or alkyl group, with the proviso that any two of $R^1$ to $R^4$ and Y may be connected to each other to form a 5- to 7-membered ring.

17. The aqueous ink according to claim 16, wherein said compound represented by general formula (I) is a compound represented by general formula (II) having a water-soluble group W:

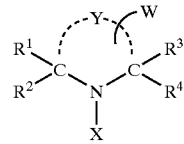
(II)

wherein W represents —OH group, —SO$_3$H group, —SO$_2$NH—(R) group, phenolic hydroxyl group, —CON(R)—OH group or —COOH group wherein R represents H or alkyl group.

18. The aqueous ink according to claim 16, wherein in the compound represented by general formula (I), $R^1$, $R^2$, $R^3$ and $R^4$ each represents an alkyl group.

19. The aqueous ink according to claim 16, wherein in the compound represented by the general formula (I), Y and the bond formed by C and N connected thereto form a 6-membered ring.

* * * * *